(12) United States Patent
Cox

(10) Patent No.: US 9,883,253 B1
(45) Date of Patent: *Jan. 30, 2018

(54) METHODS FOR USING EXTRACTED FEATURE VECTORS TO PERFORM AN ACTION ASSOCIATED WITH A PRODUCT

(71) Applicant: Network-1 Technologies, Inc., New York, NY (US)

(72) Inventor: Ingemar J. Cox, Copenhagen (DK)

(73) Assignee: NETWORK-1 TECHNOLOGIES, INC., New York, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/355,464

(22) Filed: Nov. 18, 2016

Related U.S. Application Data

(63) Continuation of application No. 14/981,219, filed on Dec. 28, 2015, now Pat. No. 9,538,216, which is a
(Continued)

(51) Int. Cl.
*H04N 21/43* (2011.01)
*H04N 21/81* (2011.01)
(Continued)

(52) U.S. Cl.
CPC ..... *H04N 21/812* (2013.01); *H04N 21/23418* (2013.01); *H04N 21/4788* (2013.01); *H04N 21/47815* (2013.01); *H04N 21/6125* (2013.01)

(58) Field of Classification Search
None
See application file for complete search history.

(56) References Cited

U.S. PATENT DOCUMENTS 3,919,479 A   11/1975   Moon et al.
4,230,990 A   10/1980   Lert, Jr. et al.
(Continued)

FOREIGN PATENT DOCUMENTS

EP   0194143 A2   10/1986
EP   0838960 A2   4/1998
(Continued)

OTHER PUBLICATIONS

Patent Owner's Response Pursuant to 37 C.F.R. § 42.120, *Google Inc.* v. *Network-1 Technologies, Inc.*, IPR2015-00343 (P.T.A.B. Sep. 18, 2015).
(Continued)

*Primary Examiner* — Cai Chen
(74) *Attorney, Agent, or Firm* — Amster, Rothstein & Ebenstein LLP

(57) ABSTRACT

A method comprising the steps of:
receiving, from a user electronic device at a computer system, one or more extracted feature vectors that are compact representations of one or more video frames of a video displayed at the user device; identifying, at the computer system, one or more products related to the one or more video frames based at least in part on an approximate nearest neighbor search of an electronic database of reference feature vectors corresponding to one or more reference works that identifies any match within a threshold of at least one of the reference feature vectors to the one or more extracted feature vectors but does not guarantee to identify the closest match to the one or more extracted feature vectors; providing, by the computer system to the user electronic device, the identified one or more products along with action information associated with the identified one or more products, wherein the action information is related to an action to be performed at the user electronic device;
(Continued)

receiving, at the computer system from the user electronic device, a selection of one of the identified one or more products; and providing, to the electronic device, machine readable instructions for performance of the action associated with the selected one of the identified one or more products.

10 Claims, 10 Drawing Sheets

Related U.S. Application Data continuation of application No. 13/830,986, filed on Mar. 14, 2013, now Pat. No. 9,282,359, which is a continuation of application No. 13/800,573, filed on Mar. 13, 2013, now Pat. No. 8,904,464, which is a continuation of application No. 13/338,079, filed on Dec. 27, 2011, now Pat. No. 8,640,179, which is a continuation of application No. 11/977,202, filed on Oct. 23, 2007, now Pat. No. 8,205,237, which is a continuation of application No. 11/445,928, filed on Jun. 2, 2006, now Pat. No. 8,010,988, which is a continuation-in-part of application No. 09/950,972, filed on Sep. 13, 2001, now Pat. No. 7,058,223.

(60) Provisional application No. 60/232,618, filed on Sep. 14, 2000.

(51) Int. Cl.
*H04N 21/478* (2011.01)
*H04N 21/234* (2011.01)
*H04N 21/61* (2011.01)
*H04N 21/4788* (2011.01)

(56) References Cited

U.S. PATENT DOCUMENTS

| | | |
|---|---|---|
| 4,381,522 A | 4/1983 | Lambert |
| 4,450,531 A | 5/1984 | Kenyon et al. |
| 4,454,594 A | 6/1984 | Heffron et al. |
| 4,495,526 A | 1/1985 | Baranoff-Rossine |
| 4,499,601 A | 2/1985 | Matthews |
| 4,511,917 A | 4/1985 | Kohler et al. |
| 4,547,804 A | 10/1985 | Greenberg |
| 4,634,966 A | 1/1987 | Nakatani et al. |
| 4,639,779 A | 1/1987 | Greenberg |
| 4,677,455 A | 6/1987 | Okajima |
| 4,677,466 A | 6/1987 | Lert, Jr. et al. |
| 4,682,370 A | 7/1987 | Matthews |
| 4,697,209 A | 9/1987 | Kiervit et al. |
| 4,706,121 A | 11/1987 | Young |
| 4,739,398 A | 4/1988 | Thomas et al. |
| 4,776,017 A | 10/1988 | Fujimoto |
| 4,805,020 A | 2/1989 | Greenberg |
| 4,843,526 A | 6/1989 | Price, III |
| 4,843,562 A | 6/1989 | Kenyon et al. |
| 4,918,730 A | 4/1990 | Schulze |
| 5,210,820 A | 5/1993 | Kenyon |
| 5,283,819 A | 2/1994 | Glick et al. |
| 5,410,326 A | 4/1995 | Goldstein |
| 5,437,050 A | 7/1995 | Lamb et al. |
| 5,438,355 A | 8/1995 | Palmer |
| 5,465,353 A | 11/1995 | Hull et al. |
| 5,479,268 A | 12/1995 | Young et al. |
| 5,481,294 A | 1/1996 | Thomas et al. |
| 5,504,518 A | 4/1996 | Ellis et al. |
| 5,550,735 A | 8/1996 | Slade et al. |
| 5,581,658 A | 12/1996 | O'Hagan et al. |
| 5,584,025 A | 12/1996 | Keithley et al. |
| 5,589,892 A | 12/1996 | Knee et al. |
| 5,594,934 A | 1/1997 | Lu et al. |
| 5,594,936 A | 1/1997 | Rebec et al. |
| 5,607,356 A | 3/1997 | Schwartz |
| 5,629,739 A | 5/1997 | Dougherty |
| 5,634,012 A | 5/1997 | Stefik et al. |
| 5,638,443 A | 6/1997 | Stefik et al. |
| 5,648,824 A | 7/1997 | Dunn et al. |
| 5,686,954 A | 11/1997 | Yoshinobu et al. |
| 5,692,213 A | 11/1997 | Goldberg et al. |
| 5,701,452 A | 12/1997 | Siefert |
| 5,701,542 A | 12/1997 | Sasayama |
| 5,706,364 A | 1/1998 | Kopec et al. |
| 5,721,827 A | 2/1998 | Logan et al. |
| 5,724,605 A | 3/1998 | Wissner |
| 5,734,853 A | 3/1998 | Hendricks et al. |
| 5,745,900 A | 4/1998 | Burrows |
| 5,748,783 A | 5/1998 | Rhoads |
| 5,751,956 A | 5/1998 | Kirsch |
| 5,758,258 A | 5/1998 | Shoff et al. |
| 5,759,101 A | 6/1998 | Von Kohorn |
| 5,768,426 A | 6/1998 | Rhoads |
| 5,774,664 A | 6/1998 | Hidary et al. |
| 5,774,666 A | 6/1998 | Portuesi |
| 5,778,181 A | 7/1998 | Hidary et al. |
| 5,778,187 A | 7/1998 | Monteiro et al. |
| 5,782,692 A | 7/1998 | Stelovsky |
| 5,790,176 A | 8/1998 | Craig |
| 5,796,393 A | 8/1998 | MacNaughton et al. |
| 5,796,952 A | 8/1998 | Davis et al. |
| 5,798,785 A | 8/1998 | Hendricks et al. |
| 5,809,471 A | 9/1998 | Brodsky |
| 5,809,512 A | 9/1998 | Kato |
| 5,812,123 A | 9/1998 | Rowe et al. |
| 5,813,014 A | 9/1998 | Gustman |
| 5,818,441 A | 10/1998 | Throckmorton et al. |
| 5,818,935 A | 10/1998 | Maa |
| 5,822,436 A | 10/1998 | Rhoads |
| 5,826,102 A | 10/1998 | Escobar |
| 5,832,119 A | 11/1998 | Rhoads |
| 5,832,182 A | 11/1998 | Zhang et al. |
| 5,832,499 A | 11/1998 | Gustman |
| 5,841,978 A | 11/1998 | Rhoads |
| 5,850,218 A | 12/1998 | LaJoie et al. |
| 5,850,490 A | 12/1998 | Johnson |
| 5,855,008 A | 12/1998 | Goldhaber et al. |
| 5,859,898 A | 1/1999 | Checco |
| 5,862,260 A | 1/1999 | Rhoads |
| 5,867,821 A | 2/1999 | Ballantyne |
| 5,874,686 A | 2/1999 | Ghias et al. |
| 5,892,536 A | 4/1999 | Logan et al. |
| 5,903,816 A | 5/1999 | Broadwin et al. |
| 5,905,865 A | 5/1999 | Palmer et al. |
| 5,905,988 A | 5/1999 | Schwartz et al. |
| 5,907,322 A | 5/1999 | Kelly et al. |
| 5,914,746 A | 6/1999 | Matthews |
| 5,918,223 A | 6/1999 | Blum et al. |
| 5,926,230 A | 7/1999 | Niijima et al. |
| 5,929,849 A | 7/1999 | Kikinis |
| 5,929,850 A | 7/1999 | Broadwin et al. |
| 5,931,901 A | 8/1999 | Wolfe |
| 5,931,908 A | 8/1999 | Gerba et al. |
| 5,937,331 A | 8/1999 | Kalluri et al. |
| 5,953,005 A | 9/1999 | Liu |
| 5,953,415 A | 9/1999 | Nielsen |
| 5,956,716 A | 9/1999 | Kenner et al. |
| 5,961,603 A | 10/1999 | Kunkel et al. |
| 5,963,966 A | 10/1999 | Mitchell et al. |
| 5,973,685 A | 10/1999 | Schaffa et al. |
| 5,973,723 A | 10/1999 | DeLuca |
| 5,978,791 A | 11/1999 | Farber et al. |
| 5,983,171 A | 11/1999 | Yokoyama et al. |
| 5,983,176 A | 11/1999 | Hoffert et al. |
| 5,991,801 A | 11/1999 | Rebec et al. |
| 5,996,006 A | 11/1999 | Speicher |
| 5,999,689 A | 12/1999 | Iggulden |
| 6,005,561 A | 12/1999 | Hawkins et al. |
| 6,006,256 A | 12/1999 | Zdepski et al. |
| 6,006,265 A | 12/1999 | Rangan et al. |
| 6,008,803 A | 12/1999 | Rowe et al. |
| 6,009,410 A | 12/1999 | LeMole et al. |

(56) References Cited

U.S. PATENT DOCUMENTS

| | | |
|---|---|---|
| 6,011,758 A | 1/2000 | Dockes et al. |
| 6,021,433 A | 2/2000 | Payne et al. |
| 6,023,693 A | 2/2000 | Masuoka et al. |
| 6,025,837 A | 2/2000 | Matthews et al. |
| 6,026,439 A | 2/2000 | Chowdhury et al. |
| 6,038,591 A | 3/2000 | Wolfe |
| 6,044,376 A | 3/2000 | Kurtzman, II |
| 6,044,402 A | 3/2000 | Jacobson et al. |
| 6,047,327 A | 4/2000 | Tso et al. |
| 6,049,823 A | 4/2000 | Hwang |
| 6,052,693 A | 4/2000 | Smith et al. |
| 6,057,872 A | 5/2000 | Candelore |
| 6,061,056 A | 5/2000 | Menard et al. |
| 6,067,369 A | 5/2000 | Kamei |
| 6,088,455 A | 7/2000 | Logan et al. |
| 6,088,707 A | 7/2000 | Bates et al. |
| 6,092,080 A | 7/2000 | Gustman |
| 6,096,961 A | 8/2000 | Bruti et al. |
| 6,098,106 A | 8/2000 | Philyaw et al. |
| 6,100,883 A | 8/2000 | Hoarty |
| 6,118,442 A | 9/2000 | Tanigawa |
| 6,118,450 A | 9/2000 | Proehl et al. |
| 6,119,124 A | 9/2000 | Broder et al. |
| 6,121,530 A | 9/2000 | Sonoda |
| 6,148,081 A | 11/2000 | Szymanski et al. |
| 6,154,737 A | 11/2000 | Inaba et al. |
| 6,161,142 A | 12/2000 | Wolfe |
| 6,169,986 B1 | 1/2001 | Bowman et al. |
| 6,173,406 B1 | 1/2001 | Wang et al. |
| 6,177,931 B1 | 1/2001 | Alexander et al. |
| 6,188,010 B1 | 2/2001 | Iwamura |
| 6,195,693 B1 | 2/2001 | Berry et al. |
| 6,201,176 B1 | 3/2001 | Yourlo |
| 6,205,582 B1 | 3/2001 | Hoarty |
| 6,215,483 B1 | 4/2001 | Zigmond |
| 6,229,922 B1 | 5/2001 | Sasakawa et al. |
| 6,230,192 B1 | 5/2001 | Roberts et al. |
| 6,233,682 B1 | 5/2001 | Fritsch |
| 6,236,758 B1 | 5/2001 | Sodagar et al. |
| 6,237,146 B1 | 5/2001 | Richards |
| 6,240,409 B1 | 5/2001 | Aiken |
| 6,243,725 B1 | 6/2001 | Hempleman et al. |
| 6,247,133 B1 | 6/2001 | Palage et al. |
| 6,253,193 B1 | 6/2001 | Ginter et al. |
| 6,263,348 B1 | 7/2001 | Kathrow et al. |
| 6,263,505 B1 | 7/2001 | Walker et al. |
| 6,269,275 B1 | 7/2001 | Slade |
| 6,279,010 B1 | 8/2001 | Anderson |
| 6,285,407 B1 | 9/2001 | Yasuki et al. |
| 6,289,346 B1 | 9/2001 | Milewski et al. |
| 6,305,016 B1 | 10/2001 | Marshall et al. |
| 6,317,885 B1 | 11/2001 | Fries |
| 6,326,982 B1 | 12/2001 | Wu et al. |
| 6,330,593 B1 | 12/2001 | Roberts et al. |
| 6,339,810 B1 | 1/2002 | Basham et al. |
| 6,345,256 B1 | 2/2002 | Milsted et al. |
| 6,349,296 B1 | 2/2002 | Broder et al. |
| 6,357,042 B2 | 3/2002 | Srinivasan |
| 6,360,215 B1 | 3/2002 | Judd et al. |
| 6,363,377 B1 | 3/2002 | Kravets et al. |
| 6,374,225 B1 | 4/2002 | Hejna, Jr. |
| 6,374,260 B1 | 4/2002 | Hoffert et al. |
| 6,381,601 B1 | 4/2002 | Fujiwara et al. |
| 6,385,596 B1 | 5/2002 | Wiser et al. |
| 6,400,407 B1 | 6/2002 | Zigmond et al. |
| 6,407,680 B1 | 6/2002 | Lai et al. |
| 6,408,128 B1 | 6/2002 | Abecassis |
| 6,415,280 B1 | 7/2002 | Farber et al. |
| 6,415,438 B1 | 7/2002 | Blackketter et al. |
| 6,418,421 B1 | 7/2002 | Hurtado et al. |
| 6,438,556 B1 | 8/2002 | Malik et al. |
| 6,446,068 B1 | 9/2002 | Kortge |
| 6,449,226 B1 | 9/2002 | Kumagai |
| 6,452,874 B1 | 9/2002 | Otsuka et al. |
| 6,453,252 B1 | 9/2002 | Laroche |
| 6,460,050 B1 | 10/2002 | Pace et al. |
| 6,460,180 B1 | 10/2002 | Park et al. |
| 6,469,749 B1 | 10/2002 | Dimitrova |
| 6,473,804 B1 | 10/2002 | Kaiser et al. |
| 6,477,704 B1 | 11/2002 | Cremia |
| 6,490,279 B1 | 12/2002 | Chen et al. |
| 6,496,802 B1 | 12/2002 | Van Zoest et al. |
| 6,496,857 B1 | 12/2002 | Dustin et al. |
| 6,505,160 B1 | 1/2003 | Levy et al. |
| 6,539,548 B1 | 3/2003 | Hendricks et al. |
| 6,542,869 B1 | 4/2003 | Foote |
| 6,546,393 B1 | 4/2003 | Khan |
| 6,550,001 B1 | 4/2003 | Corwin et al. |
| 6,550,011 B1 | 4/2003 | Sims, III |
| 6,552,254 B2 | 4/2003 | Hasegawa et al. |
| 6,563,515 B1 | 5/2003 | Reynolds et al. |
| 6,564,379 B1 | 5/2003 | Knee et al. |
| 6,564,380 B1 | 5/2003 | Murphy |
| 6,567,982 B1 | 5/2003 | Howe et al. |
| 6,571,392 B1 | 5/2003 | Zigmond et al. |
| 6,577,746 B1 | 6/2003 | Evans et al. |
| 6,591,245 B1 | 7/2003 | Klug |
| 6,597,405 B1 | 7/2003 | Iggulden |
| 6,598,228 B2 | 7/2003 | Hejna, Jr. |
| 6,604,242 B1 | 8/2003 | Weinstein et al. |
| 6,609,105 B2 | 8/2003 | Van Zoest et al. |
| 6,615,408 B1 | 9/2003 | Kaiser et al. |
| 6,631,523 B1 | 10/2003 | Matthews, III et al. |
| 6,636,247 B1 | 10/2003 | Hamzy et al. |
| 6,654,757 B1 | 11/2003 | Stern |
| 6,658,423 B1 | 12/2003 | Pugh et al. |
| 6,665,661 B1 | 12/2003 | Crow et al. |
| 6,668,378 B2 | 12/2003 | Leak et al. |
| 6,675,174 B1 | 1/2004 | Bolle et al. |
| 6,675,385 B1 | 1/2004 | Wang |
| 6,693,236 B1 | 2/2004 | Gould et al. |
| 6,698,020 B1 | 2/2004 | Zigmond et al. |
| 6,711,617 B1 | 3/2004 | Bantz et al. |
| 6,738,978 B1 | 5/2004 | Hendricks |
| 6,754,904 B1 | 6/2004 | Cooper et al. |
| 6,757,294 B1 | 6/2004 | Maruyama |
| 6,766,523 B2 | 7/2004 | Herley |
| 6,774,926 B1 | 8/2004 | Ellis et al. |
| 6,782,186 B1 | 8/2004 | Covell et al. |
| 6,785,275 B1 | 8/2004 | Boivie et al. |
| 6,785,902 B1 | 8/2004 | Zigmond et al. |
| 6,804,825 B1 | 10/2004 | White et al. |
| 6,810,388 B1 | 10/2004 | Sato |
| 6,833,865 B1 | 12/2004 | Fuller et al. |
| 6,834,110 B1 | 12/2004 | Marconcini et al. |
| 6,834,308 B1 | 12/2004 | Ikezoye et al. |
| 6,845,396 B1 | 1/2005 | Kanojia et al. |
| 6,850,252 B1 | 2/2005 | Hoffberg |
| 6,868,507 B1 | 3/2005 | Gurumoorthy et al. |
| 6,871,200 B2 | 3/2005 | MacQueen et al. |
| 6,871,231 B2 | 3/2005 | Morris |
| 6,873,982 B1 | 3/2005 | Bates et al. |
| 6,898,762 B2 | 5/2005 | Ellis et al. |
| 6,912,571 B1 | 6/2005 | Serena |
| 6,928,423 B1 | 8/2005 | Yamanaka |
| 6,928,442 B2 | 8/2005 | Farber et al. |
| 6,931,451 B1 | 8/2005 | Logan et al. |
| 6,937,766 B1 | 8/2005 | Wilf et al. |
| 6,938,270 B2 | 8/2005 | Blackketter et al. |
| 6,941,275 B1 | 9/2005 | Swierczek |
| 6,941,574 B1 | 9/2005 | Broadwin et al. |
| 6,944,632 B2 | 9/2005 | Stern |
| 6,968,337 B2 | 11/2005 | Wold |
| 6,970,886 B1 | 11/2005 | Conwell et al. |
| 6,978,419 B1 | 12/2005 | Kantrowitz |
| 6,978,461 B2 | 12/2005 | Shapiro et al. |
| 6,983,371 B1 | 1/2006 | Hurtado et al. |
| 6,990,453 B2 | 1/2006 | Wang et al. |
| 6,990,677 B1 | 1/2006 | Pietraszak et al. |
| 6,999,111 B2 | 2/2006 | McIntyre et al. |
| 7,013,301 B2 | 3/2006 | Holm et al. |
| 7,020,635 B2 | 3/2006 | Hamilton et al. |
| 7,028,327 B1 | 4/2006 | Dougherty et al. |
| 7,035,914 B1 | 4/2006 | Payne et al. |

(56) References Cited

U.S. PATENT DOCUMENTS

| | | |
|---|---|---|
| 7,039,935 B2 | 5/2006 | Knudson et al. |
| 7,043,473 B1 | 5/2006 | Rassool et al. |
| 7,055,166 B1 | 5/2006 | Logan et al. |
| 7,058,223 B2 | 6/2006 | Cox |
| 7,065,709 B2 | 6/2006 | Ellis et al. |
| 7,092,953 B1 | 8/2006 | Haynes |
| 7,096,486 B1 | 8/2006 | Ukai et al. |
| 7,100,185 B2 | 8/2006 | Bennington et al. |
| 7,103,905 B2 | 9/2006 | Novak |
| 7,103,906 B1 | 9/2006 | Katz et al. |
| 7,106,904 B2 | 9/2006 | Shuma |
| 7,140,033 B1 | 11/2006 | Durden et al. |
| 7,146,631 B1 | 12/2006 | Tanaka et al. |
| 7,152,236 B1 | 12/2006 | Wugofski et al. |
| 7,155,449 B2 | 12/2006 | Pingel et al. |
| 7,158,929 B2 | 1/2007 | Wouters et al. |
| 7,165,266 B2 | 1/2007 | Zigmond |
| 7,168,083 B2 | 1/2007 | Kalker et al. |
| 7,171,016 B1 | 1/2007 | Rhoads |
| 7,174,293 B2 | 2/2007 | Kenyon et al. |
| 7,181,756 B1 | 2/2007 | Zigmond et al. |
| 7,184,100 B1 | 2/2007 | Wilf et al. |
| 7,188,353 B1 | 3/2007 | Crinon |
| 7,191,190 B2 | 3/2007 | Debique et al. |
| 7,194,754 B2 | 3/2007 | Tomsen et al. |
| 7,213,005 B2 | 5/2007 | Mourad et al. |
| 7,222,163 B1 | 5/2007 | Girouard et al. |
| 7,225,455 B2 | 5/2007 | Bennington et al. |
| 7,237,253 B1 | 6/2007 | Blackketter et al. |
| 7,243,139 B2 | 7/2007 | Ullman |
| 7,243,153 B2 | 7/2007 | McIntyre et al. |
| 7,251,475 B2 | 7/2007 | Kawamoto |
| 7,254,829 B1 | 8/2007 | Brown et al. |
| 7,272,788 B2 | 9/2007 | Anderson et al. |
| 7,272,843 B1 | 9/2007 | Nejime et al. |
| 7,277,870 B2 | 10/2007 | Mourad et al. |
| 7,302,574 B2 | 11/2007 | Conwell et al. |
| 7,305,693 B2 | 12/2007 | Blackketter et al. |
| 7,308,413 B1 | 12/2007 | Tota et al. |
| 7,313,805 B1 | 12/2007 | Rosin et al. |
| 7,334,250 B2 | 2/2008 | Blackketter et al. |
| 7,340,763 B1 | 3/2008 | Harris |
| 7,346,472 B1 | 3/2008 | Moskowitz et al. |
| 7,349,668 B2 | 3/2008 | Ilan et al. |
| 7,363,278 B2 | 4/2008 | Schmelzer et al. |
| 7,366,718 B1 | 4/2008 | Pugh et al. |
| 7,366,787 B2 | 4/2008 | Salas et al. |
| 7,369,677 B2 | 5/2008 | Petrovic et al. |
| 7,370,017 B1 | 5/2008 | Lindeman et al. |
| 7,386,512 B1 | 6/2008 | Allibhoy et al. |
| 7,392,532 B2 | 6/2008 | White et al. |
| 7,404,200 B1 | 7/2008 | Hailey et al. |
| 7,409,437 B2 | 8/2008 | Ullman et al. |
| 7,421,723 B2 | 9/2008 | Harkness et al. |
| 7,423,771 B2 | 9/2008 | Ohata et al. |
| 7,426,558 B1 | 9/2008 | Allibhoy et al. |
| 7,444,353 B1 | 10/2008 | Chen et al. |
| 7,471,834 B2 | 12/2008 | Sull et al. |
| 7,477,739 B2 | 1/2009 | Haitsma et al. |
| 7,483,958 B1 | 1/2009 | Elabbady et al. |
| 7,487,527 B2 | 2/2009 | Ellis et al. |
| 7,493,643 B2 | 2/2009 | Ellis |
| 7,500,007 B2 | 3/2009 | Ikezoye et al. |
| 7,506,352 B2 | 3/2009 | Blackketter et al. |
| 7,523,312 B2 | 4/2009 | Kalker et al. |
| 7,523,478 B2 | 4/2009 | Blackketter et al. |
| 7,529,659 B2 | 5/2009 | Wold |
| 7,548,565 B2 | 6/2009 | Sull et al. |
| 7,562,012 B1 | 7/2009 | Wold et al. |
| 7,562,392 B1 | 7/2009 | Rhoads et al. |
| 7,565,294 B2 | 7/2009 | Rhoads |
| 7,565,327 B2 | 7/2009 | Schmelzer |
| 7,587,728 B2 | 9/2009 | Wheeler et al. |
| 7,595,914 B2 | 9/2009 | Haining |
| 7,606,883 B1 | 10/2009 | Allibhoy et al. |
| 7,624,337 B2 | 11/2009 | Sull et al. |
| 7,631,072 B2 | 12/2009 | Allibhoy et al. |
| 7,644,429 B2 | 1/2010 | Bayassi et al. |
| 7,647,604 B2 | 1/2010 | Ramaswamy |
| 7,650,616 B2 | 1/2010 | Lee |
| 7,660,700 B2 | 2/2010 | Moskowitz et al. |
| 7,690,020 B2 | 3/2010 | Lebar |
| 7,707,088 B2 | 4/2010 | Schmelzer |
| 7,711,652 B2 | 5/2010 | Schmelzer |
| 7,712,125 B2 | 5/2010 | Herigstad et al. |
| 7,720,707 B1 | 5/2010 | Mowry |
| 7,738,704 B2 | 6/2010 | Lienhart et al. |
| 7,743,092 B2 | 6/2010 | Wood |
| 7,757,248 B2 | 7/2010 | Harkness et al. |
| 7,757,254 B2 | 7/2010 | Shoff et al. |
| 7,765,575 B2 | 7/2010 | Zigmond |
| 7,783,489 B2 | 8/2010 | Kenyon et al. |
| 7,797,249 B2 | 9/2010 | Schmelzer et al. |
| 7,802,281 B1 | 9/2010 | Tani et al. |
| 7,818,768 B2 | 10/2010 | Blackketter et al. |
| 7,835,920 B2 | 11/2010 | Snyder et al. |
| 7,840,975 B2 | 11/2010 | Matheny et al. |
| 7,849,226 B2 | 12/2010 | Zigmond et al. |
| 7,853,664 B1 | 12/2010 | Wang et al. |
| 7,861,275 B1 | 12/2010 | Vellaikal et al. |
| 7,870,088 B1 | 1/2011 | Chen et al. |
| 7,877,438 B2 | 1/2011 | Schrempp et al. |
| 7,882,518 B2 | 2/2011 | Finseth et al. |
| 7,917,645 B2 | 3/2011 | Ikezoye |
| 7,926,079 B2 | 4/2011 | Lebar |
| 7,930,719 B2 | 4/2011 | Ellis et al. |
| 7,941,816 B2 | 5/2011 | Harkness et al. |
| 7,945,929 B2 | 5/2011 | Knudson et al. |
| 7,949,494 B2 | 5/2011 | Moskowitz et al. |
| 7,949,749 B2 | 5/2011 | Allibhoy et al. |
| 7,962,414 B1 | 6/2011 | Allibhoy et al. |
| 7,987,492 B2 | 7/2011 | Liwerant et al. |
| 7,996,565 B2 | 8/2011 | Allibhoy et al. |
| 8,001,569 B2 | 8/2011 | Marler et al. |
| 8,006,263 B2 | 8/2011 | Ellis et al. |
| 8,006,264 B2 | 8/2011 | Reynolds et al. |
| 8,006,314 B2 | 8/2011 | Wold |
| 8,065,615 B2 | 11/2011 | Murray et al. |
| 8,082,150 B2 | 12/2011 | Wold |
| 8,086,445 B2 | 12/2011 | Wold et al. |
| 8,090,605 B2 | 1/2012 | Tota et al. |
| 8,094,949 B1 | 1/2012 | Rhoads |
| 8,108,886 B1 | 1/2012 | Murahashi et al. |
| 8,112,776 B2 | 2/2012 | Schein et al. |
| 8,171,509 B1 | 5/2012 | Girouard et al. |
| 8,171,510 B2 | 5/2012 | Kamen et al. |
| 8,185,923 B2 | 5/2012 | Slaney et al. |
| 8,214,175 B2 | 7/2012 | Moskowitz et al. |
| 8,214,254 B1 | 7/2012 | Mowry |
| 8,219,446 B1 | 7/2012 | Mowry |
| RE43,578 E | 8/2012 | Sorensen |
| 8,249,924 B1 | 8/2012 | Mowry |
| 8,255,952 B2 | 8/2012 | Boylan, III et al. |
| RE43,671 E | 9/2012 | Sorensen |
| 8,272,011 B2 | 9/2012 | Yuen et al. |
| 8,296,792 B2 | 10/2012 | Sahota et al. |
| 8,301,758 B2 | 10/2012 | Allibhoy et al. |
| 8,340,994 B2 | 12/2012 | Tota et al. |
| 8,406,607 B2 | 3/2013 | Nesvadba et al. |
| 8,438,608 B2 | 5/2013 | Liwerant et al. |
| 8,464,302 B1 | 6/2013 | Liwerant et al. |
| 8,479,233 B2 | 7/2013 | Ellis et al. |
| 8,479,246 B2 | 7/2013 | Hudson et al. |
| 8,572,279 B2 | 10/2013 | Payne et al. |
| 8,601,154 B2 | 12/2013 | Payne et al. |
| 9,143,718 B2 | 9/2015 | Nagorski et al. |
| 9,414,008 B2 | 8/2016 | Nagorski et al. |
| 2001/0001160 A1 | 5/2001 | Shoff et al. |
| 2001/0003818 A1 | 6/2001 | Pingel et al. |
| 2001/0014210 A1 | 8/2001 | Kang |
| 2001/0018771 A1 | 8/2001 | Walker et al. |
| 2001/0033736 A1 | 10/2001 | Yap |
| 2001/0037376 A1 | 11/2001 | Ullman |
| 2001/0047298 A1 | 11/2001 | Moore et al. |

(56) References Cited

U.S. PATENT DOCUMENTS

| | | |
|---|---|---|
| 2001/0049625 A1 | 12/2001 | Mowry |
| 2001/0052132 A1 | 12/2001 | Fryer |
| 2002/0023020 A1 | 2/2002 | Kenyon et al. |
| 2002/0026369 A1 | 2/2002 | Miller et al. |
| 2002/0032698 A1 | 3/2002 | Cox |
| 2002/0035600 A1 | 3/2002 | Ullman |
| 2002/0035601 A1 | 3/2002 | Ullman |
| 2002/0035614 A1 | 3/2002 | Ullman |
| 2002/0035615 A1 | 3/2002 | Ullman |
| 2002/0038296 A1 | 3/2002 | Margolus et al. |
| 2002/0038383 A1 | 3/2002 | Ullman et al. |
| 2002/0042813 A1 | 4/2002 | Ullman et al. |
| 2002/0046178 A1 | 4/2002 | Morito et al. |
| 2002/0049832 A1 | 4/2002 | Ullman et al. |
| 2002/0056091 A1 | 5/2002 | Bala et al. |
| 2002/0056104 A1 | 5/2002 | Burnhouse et al. |
| 2002/0056123 A1 | 5/2002 | Liwerant et al. |
| 2002/0056129 A1 | 5/2002 | Blackketter et al. |
| 2002/0059610 A1 | 5/2002 | Ellis |
| 2002/0069218 A1 | 6/2002 | Sull et al. |
| 2002/0073424 A1 | 6/2002 | Ward et al. |
| 2002/0082731 A1 | 6/2002 | Pitman et al. |
| 2002/0083005 A1 | 6/2002 | Lowenstein et al. |
| 2002/0087661 A1 | 7/2002 | Matichuk et al. |
| 2002/0087885 A1 | 7/2002 | Peled et al. |
| 2002/0088336 A1 | 7/2002 | Stahl |
| 2002/0092019 A1 | 7/2002 | Marcus |
| 2002/0099555 A1 | 7/2002 | Pitman et al. |
| 2002/0104099 A1 | 8/2002 | Novak |
| 2002/0112002 A1 | 8/2002 | Abato |
| 2002/0120925 A1 | 8/2002 | Logan |
| 2002/0133499 A1 | 9/2002 | Ward et al. |
| 2002/0138843 A1 | 9/2002 | Samaan et al. |
| 2002/0150164 A1 | 10/2002 | Felts et al. |
| 2002/0156760 A1 | 10/2002 | Lawrence et al. |
| 2002/0156909 A1 | 10/2002 | Harrington |
| 2002/0176702 A1 | 11/2002 | Frantz |
| 2002/0178276 A1 | 11/2002 | McCartney et al. |
| 2002/0184634 A1 | 12/2002 | Cooper |
| 2002/0186887 A1 | 12/2002 | Rhoads |
| 2002/0188699 A1 | 12/2002 | Ullman et al. |
| 2003/0005151 A1 | 1/2003 | Ullman et al. |
| 2003/0019527 A1 | 1/2003 | Oppermann et al. |
| 2003/0028489 A1 | 2/2003 | Williamson |
| 2003/0037010 A1 | 2/2003 | Schmelzer |
| 2003/0061490 A1 | 3/2003 | Abajian |
| 2003/0065719 A1 | 4/2003 | Ullman |
| 2003/0081939 A1 | 5/2003 | Kim et al. |
| 2003/0088674 A1 | 5/2003 | Ullman |
| 2003/0093790 A1 | 5/2003 | Logan et al. |
| 2003/0095660 A1* | 5/2003 | Lee .................. G06F 21/10 380/231 |
| 2003/0101144 A1 | 5/2003 | Moreno |
| 2003/0101232 A1 | 5/2003 | Ullman |
| 2003/0106017 A1 | 6/2003 | Kanchirayappa et al. |
| 2003/0123276 A1 | 7/2003 | Yokozeki |
| 2003/0146940 A1 | 8/2003 | Ellis et al. |
| 2003/0167300 A1 | 9/2003 | Ullman |
| 2003/0182113 A1 | 9/2003 | Huang |
| 2003/0191816 A1 | 10/2003 | Landress |
| 2003/0202660 A1 | 10/2003 | Zhou et al. |
| 2003/0208756 A1 | 11/2003 | Macrae et al. |
| 2003/0226150 A1 | 12/2003 | Berberet |
| 2003/0233930 A1 | 12/2003 | Ozick |
| 2004/0003398 A1 | 1/2004 | Donian et al. |
| 2004/0010602 A1 | 1/2004 | Van Vleck et al. |
| 2004/0015608 A1 | 1/2004 | Ellis et al. |
| 2004/0025174 A1 | 2/2004 | Cerrato et al. |
| 2004/0030759 A1 | 2/2004 | Hidary |
| 2004/0078825 A1 | 4/2004 | Murphy |
| 2004/0123314 A1 | 6/2004 | Bova |
| 2004/0163106 A1 | 8/2004 | Schrempp et al. |
| 2004/0170335 A1 | 9/2004 | Pearlman et al. |
| 2004/0199387 A1 | 10/2004 | Wang et al. |
| 2004/0221118 A1 | 11/2004 | Slater et al. |
| 2004/0234936 A1 | 11/2004 | Ullman |
| 2004/0240562 A1 | 12/2004 | Bargeron et al. |
| 2004/0243540 A1 | 12/2004 | Moskowitz et al. |
| 2005/0015795 A1 | 1/2005 | Iggulden |
| 2005/0015815 A1 | 1/2005 | Shoff et al. |
| 2005/0044189 A1 | 2/2005 | Ikezoye et al. |
| 2005/0044577 A1 | 2/2005 | Jerding |
| 2005/0080846 A1 | 4/2005 | McCleskey et al. |
| 2005/0097622 A1 | 5/2005 | Zigmond et al. |
| 2005/0102515 A1 | 5/2005 | Jaworski et al. |
| 2005/0154892 A1 | 7/2005 | Mihcak et al. |
| 2005/0160363 A1 | 7/2005 | Bhogal et al. |
| 2005/0193016 A1 | 9/2005 | Seet et al. |
| 2005/0213826 A1 | 9/2005 | Neogi |
| 2005/0235318 A1 | 10/2005 | Grauch et al. |
| 2005/0235319 A1 | 10/2005 | Carpenter et al. |
| 2005/0240961 A1 | 10/2005 | Jerding et al. |
| 2005/0246752 A1 | 11/2005 | Liwerant et al. |
| 2005/0283800 A1 | 12/2005 | Ellis et al. |
| 2005/0289065 A1 | 12/2005 | Weare |
| 2006/0015925 A1 | 1/2006 | Logan |
| 2006/0031870 A1 | 2/2006 | Jarman et al. |
| 2006/0080356 A1 | 4/2006 | Burges et al. |
| 2006/0085816 A1 | 4/2006 | Funk et al. |
| 2006/0101069 A1 | 5/2006 | Bell et al. |
| 2006/0110137 A1 | 5/2006 | Tsuda et al. |
| 2006/0187358 A1 | 8/2006 | Lienhart et al. |
| 2006/0195859 A1 | 8/2006 | Konig et al. |
| 2006/0195860 A1 | 8/2006 | Eldering et al. |
| 2006/0206462 A1 | 9/2006 | Barber |
| 2006/0212927 A1 | 9/2006 | Riku et al. |
| 2006/0271947 A1 | 11/2006 | Lienhart et al. |
| 2007/0041667 A1 | 2/2007 | Cox |
| 2007/0071330 A1 | 3/2007 | Oostveen et al. |
| 2007/0083510 A1 | 4/2007 | McArdle |
| 2007/0101360 A1 | 5/2007 | Gutta et al. |
| 2007/0118375 A1 | 5/2007 | Kenyon et al. |
| 2007/0124698 A1 | 5/2007 | Majumder |
| 2007/0130580 A1 | 6/2007 | Covell et al. |
| 2007/0180537 A1 | 8/2007 | He et al. |
| 2007/0203911 A1 | 8/2007 | Chiu |
| 2007/0214482 A1 | 9/2007 | Nguyen |
| 2007/0282472 A1 | 12/2007 | Seldman |
| 2007/0288518 A1 | 12/2007 | Crigler et al. |
| 2007/0294173 A1 | 12/2007 | Levy et al. |
| 2008/0052783 A1 | 2/2008 | Levy |
| 2008/0072260 A1 | 3/2008 | Rosin et al. |
| 2008/0091684 A1 | 4/2008 | Ellis et al. |
| 2008/0162478 A1 | 7/2008 | Pugh et al. |
| 2008/0189749 A1 | 8/2008 | White et al. |
| 2008/0250241 A1 | 10/2008 | Ginter et al. |
| 2009/0052784 A1 | 2/2009 | Covell et al. |
| 2009/0226148 A1 | 9/2009 | Nesvadba et al. |
| 2009/0328236 A1 | 12/2009 | Schmelzer |
| 2010/0158488 A1 | 6/2010 | Roberts et al. |
| 2010/0211969 A1 | 8/2010 | Schein et al. |
| 2010/0211975 A1 | 8/2010 | Boyer et al. |
| 2010/0290666 A1 | 11/2010 | Rhoads |
| 2011/0167449 A1 | 7/2011 | Klosterman et al. |
| 2011/0173660 A1 | 7/2011 | Schein et al. |
| 2012/0078871 A1 | 3/2012 | Pugh et al. |
| 2013/0086608 A1 | 4/2013 | Slaney et al. |
| 2013/0125158 A1 | 5/2013 | Brown |
| 2013/0302011 A1 | 11/2013 | Nagorski et al. |

FOREIGN PATENT DOCUMENTS

| | | |
|---|---|---|
| EP | 0849946 A2 | 6/1998 |
| EP | 1 164 796 A1 | 12/2001 |
| EP | 1 354 276 B1 | 12/2007 |
| EP | 1354276 B1 | 12/2007 |
| EP | 1 485 815 B1 | 7/2009 |
| GB | 2369203 A | 5/2002 |
| GB | 2386807 A | 9/2003 |
| JP | 07-284035 | 10/1995 |
| JP | 11-150692 | 6/1999 |
| JP | 2003-242281 | 8/2003 |
| WO | 94/006084 | 3/1994 |
| WO | 94/06084 A1 | 3/1994 |

(56) References Cited

FOREIGN PATENT DOCUMENTS

| | | |
|---|---|---|
| WO | 1997005616 A1 | 2/1997 |
| WO | 1998041020 A1 | 9/1998 |
| WO | 99/04568 | 1/1999 |
| WO | 9904568 A1 | 1/1999 |
| WO | 99/10822 | 3/1999 |
| WO | 99/41684 | 8/1999 |
| WO | 99/050778 | 10/1999 |
| WO | 99/50778 A1 | 10/1999 |
| WO | 00/16205 A1 | 3/2000 |
| WO | 00/20960 | 4/2000 |
| WO | 01/010124 A1 | 2/2001 |
| WO | 01/010127 | 2/2001 |
| WO | 2001011865 A1 | 2/2001 |
| WO | 01/0022688 | 3/2001 |
| WO | 2001022730 A1 | 3/2001 |
| WO | 01/038960 | 5/2001 |
| WO | 2002/008948 A2 | 1/2002 |
| WO | WO 2002/011033 A1 | 2/2002 |
| WO | WO 2002/103968 A1 | 12/2002 |
| WO | 2004019527 A1 | 3/2004 |
| WO | 2005006758 A1 | 1/2005 |

OTHER PUBLICATIONS

Petitioner's Reply to Patent Owner's Response to Petition, *Google Inc. v. Network-1 Technologies, Inc.*, IPR2015-00343 (P.T.A.B. Dec. 14, 2015).
Petitioner's Demonstratives, *Google Inc. v. Network-1 Technologies, Inc.*, IPR2015-00345 (P.T.A.B. Mar. 4, 2016).
Patent Owner's Demonstratives, *Google Inc. v. Network-1 Technologies, Inc.*, IPR2015-00345 (P.T.A.B. Mar. 4, 2016).
Record of Oral Hearing, *Google Inc. v. Network-1 Technologies, Inc.*, IPR2015-00345 (P.T.A.B. Apr. 13, 2016).
Patent Owner's Preliminary Response to the Petition for Covered Business Method Review Under 35 U.S.C. § 321 Pursuant to 37 C.F.R. § 42.207, *Google Inc. v. Network-1 Technologies, Inc.*, CBM2015-00113 (P.T.A.B. Dec. 28, 2015)
Patent Owner's Response Pursuant to 37 C.F.R. § 42.220, *Google Inc. v. Network-1 Technologies, Inc.*, CBM2015-00113 (P.T.A.B. Dec. 28, 2015).
Petitioner's Reply, *Google Inc. v. Network-1 Technologies, Inc.*, CBM2015-00113 (P.T.A.B. Mar. 1, 2016).
Declaration of Dr. George Karypis, *Google Inc. v. Network-1 Technologies, Inc.*, CBM2015-00113 (P.T.A.B. Dec. 28, 2015).
Transcript of Deposition of George Karypis, Ph.D., *Google Inc. v. Network-1 Technologies, Inc.*, CBM2015-00113 (P.T.A.B. Feb. 17, 2016).
Transcript of Deposition of Pierre Moulin, Ph.D., *Google Inc. v. Network-1 Technologies, Inc.*, CBM2015-00113 (P.T.A.B. Dec. 28, 2015).
Petitioner's Demonstratives, *Google Inc. v. Network-1 Technologies, Inc.*, CBM2015-00113 (P.T.A.B. May 6, 2016).
Patent Owner's Demonstratives, *Google Inc. v. Network-1 Technologies, Inc.*, CBM2015-00113 (P.T.A.B. May 6, 2016).
Computer Desktop Encyclopedia, 9th Ed., Osbourne/McGraw-Hill 2001, p. 470.
GCSE Bitesize Science, Satellite communication: Revision, BBC.
Graf, Modem Dictionary of Electronics, Seventh Ed. Revised and Updated, Newnes 1999, p. 359.
Kernighan et al., The C Programming Language, Second Ed., Prentice Hall PTR 1988, pp. vi-xii, 1-15, 36-39.
Lindorff, In the clutter race, cable is catching up with broadcast, Media Life Magazine, available at http://www.medialifemagazine/com:8080/news2000/apr00/news20403.html.
Margolis, Random House Webster's Computer & Internet Dictionary, Third Ed., Random House, Inc. 1999, p. 268.
MediaDailyNews, Universe Collapses: Well, TV's, Anyway (Jul. 1, 2004).
Microsoft Computer Dictionary, Fifth Ed., Microsoft Press 2002, p. 264.
Microsoft Computer Dictionary, Fifth Ed., Microsoft Press 2002, p. 276.
Microsoft Computer Dictionary, Fifth Ed., Microsoft Press 2002, p. 338.
Microsoft Computer Dictionary, Fourth Ed., Microsoft Press 1999, p. 228.
The New Oxford American Dictionary, Oxford University Press 2001, pp. 1727-1728.
New Oxford American Dictionary, Third Ed., Oxford University Press 2010, pp. 1767-1768.
Pountain, The Penguin Concise Dictionary of Computing, Penguin Books 2003, p. 221.
Quizlet, Facebook Terms AA flashcards, available at https://quizlet.com/76248870/facebook-terms-aa-flash-cards/.
The IEEE Standard Dictionary of Electrical and Electronics Terms, Sixth Ed., p. 499.
Wikipedia, Identifier, Internet Archive Jan. 11, 2004, available at https://web.archive.org/web/20040111093522/http://en.wikipedia.org/wiki/Identifier.
Wikipedia, Name and Identifier, Internet Archive Apr. 6, 2005, available at https://web.archive.org/web/20050406004314/http://en.wikipedia.org/wiki/Identifier.
Final Written Decision, *Google Inc. v. Network-1 Technologies, Inc.*, IPR2015-00343 (P.T.A.B. Jun. 20, 2016).
Final Written Decision, *Google Inc. v. Network-1 Technologies, Inc.*, IPR2015-00345 (P.T.A.B. Jun. 20, 2016).
Final Written Decision, *Google Inc. v. Network-1 Technologies, Inc.*, IPR2015-00347 (P.T.A.B. Jun. 20, 2016).
Final Written Decision, *Google Inc. v. Network-1 Technologies, Inc.*, IPR2015-00348 (P.T.A.B. Jun. 20, 2016).
*Google Inc. et al. v. Network-1 Tech., Inc.*, CBM2015-00113, Paper 35, Termination Decision Document (PTAB Oct. 18, 2016).
Opening Brief of Appellant Google Inc., *Google Inc. v. Network-1 Technologies, Inc.*, Case No. 16-2509 in the U.S. Court of Appeals for the Federal Circuit, Doc. 22, Nov. 28, 2016, 66 pages.
Decision Instituting Covered Business Method Review, *Google Inc. v. Network-1 Technologies, Inc.*, No. CBM2015-00113, Paper No. 7 (PTAB Oct. 19, 2015), re U.S. Pat. No. 8,904,464.
Petition for Inter Partes Review of U.S. Pat. No. 8,640,179, IPR2015-00343, Paper 1 (PTAB Dec. 3, 2014).
Petition for Inter Partes Review of U.S. Pat. No. 8,205,237, IPR2015-00345, Paper 1 (PTAB Dec. 3, 2014).
Petition for Inter Partes Review of U.S. Pat. No. 8,010,988, IPR2015-00347, Paper 1 (PTAB Dec. 3, 2014).
Petition for Inter Partes Review of U.S. Pat. No. 8,656,441, IPR2015-00348, Paper 1 (PTAB Dec. 3, 2014).
Declaration of Dr. Pierre Moulin in Support of Petition for Inter Partes Review of U.S. Pat. No. 8,640,179, IPR2015-00343 (PTAB Dec. 3, 2014).
Declaration of Dr. Pierre Moulin in Support of Petition for Inter Partes Review of U.S. Pat. No. 8,205,237, IPR2015-00345 (PTAB Dec. 3, 2014).
Declaration of Dr. Pierre Moulin in Support of Petition for Inter Partes Review of U.S. Pat. No. 8,010,988, IPR2015-00347 (PTAB Dec. 3, 2014).
Declaration of Dr. Pierre Moulin in Support of Petition for Inter Partes Review of U.S. Pat. No. 8,656,441, IPR2015-00348 (PTAB Dec. 3, 2014).
Prosecution History of U.S. Appl. No. 09/438,469.
Aristides, Gionis, et al., "Similarity Search in High Dimensions via Hashing", Proceedings of the 25th VLDB Conference, 1999, Edinburgh, Scotland.
Timo, Raita, "Tuning the Boyer-Moore-Horspool String Searching Algorithm", Software-Practice and Experience, Oct. 1992, 879-884, vol. 22(10).
Richard O. Duda & Peter E. Hart, Pattern Classification and Scene Analysis (1973).
Keinosuke Fukunaga, Introduction to Statistical Pattern Recognition (1990).
Paul C. Denny, Search and Enumeration Techniques for Incidence Structures, Research Report CDMTCS-085, Centre for Discrete Mathematics and Theoretical Computer Science (May 1998).
John Orwant et al., Mastering Algorithms with PERL (1999).

(56) References Cited

OTHER PUBLICATIONS

Carlborg O., Andersson L. & Kinghom B, The Use of a Genetic Algorithm for Simultaneous Mapping of Multiple Interacting Quantitative Trait Loci, Genetics 155: 2003-2010 (2000).
Dufaux, F. & Moscheni, F., Background Mosaicking for Low Bit Rate Video Coding, Image Processing, Proceedings of the IEEE International Conference on Image Processing, vol. 3, pp. 673-676 (Sep. 1996).
Robertson, G., Miller, J., & Thomson, P., Non-Exhaustive Search Methods and their Use in the Minimisation of Reed-Muller Canonical Expansions, Int. J. Electronics vol. 80, No. 1, pp. 1-12 (1996).
Sudhir Kumar, A Stepwise Algorithm for Finding Minimum Evolution Trees, Mol. Biol. Evol., vol. 13 (1996), pp. 584-593.
U.S. Appl. No. 60/230,931, filed Sep. 13, 2000.
*Network-1 Technologies, Inc.* v. *Google, Inc. et al.*, No. 1:14-cv-02396 (S.D.N.Y. filed Apr. 4, 2014).
Petition for Covered Business Method Review of U.S. Pat. No. 8,904,464, CBM2015-00113 (filed Apr. 13, 2015).
Declaration of Pierre Moulin, *Google Inc.* v. *Network-1 Technologies, Inc.*, Ex. 1003, CBM2015-00113.
W.J.E. Crissy and Gary A. Marple, What about Reader Service Cards?, 27 Journal of Marketing, No. 1, at 56-60 (Jan. 1963).
Thomas Publishing, Industrial Equipment News (Jun. 29, 1998), available at http://web.archive.org/web/19980629025648/http://www.thomaspublishing.com/annivienist.html.
Joint Claim Construction Chart, *Network-1 Technologies, Inc.* v. *Google, Inc. et al.*, No. 1:14-cv-02396 (S.D.N.Y. Feb. 6, 2015).
Patent Owner's Preliminary Response, *Google Inc.* v. *Network-1 Technologies, Inc.*, No. IPR2015-00343 (PTAB Mar. 30, 2015).
Turau, Volker, "Fixed-Radius Near Neighbors Search", Information Processing Letters, Aug. 30, 1991, 201-203, vol. 39.
Uitdenbogerd, Alexandra L. et al., "Manipulation of Music for Melody Matching", MULTIMEDIA '98 Proceedings of the sixth ACM international conference on Multimedia, 1998, pp. 235-240.
Fuller, Chuck, "Deploying Video on the Web", Web Techniques, Dec. 1999, 67-71, 4(12), United Business Media LLC, San Francisco.
"ImaginOn to Showcase Instant Interactive Internet 'Television Station in a Box' at PC EXPO 2000!," Business Wire, Jun. 22, 2000.
Jacso, Peter et al., "Now Featuring . . . Movie Databases, Part II:The Software," Database, Apr./May 1995, pp. 29-39; 18(2); ProQuest Technology Collection.
"Smarter TV to Add $25B in Revenues:Holy Grail of Advertising Coming in the Form of Metadata," Broadcaster, Aug. 2000; 8(59), Business Information Group, Canada.
"The Future of Internet Multimedia on Display at Streaming Media West '99," Business Wire, Nov. 30, 1999; 11(27), Business Wire, San Jose, California.
Bohm, Christian, et al., "Efficient Similarity Search in Digital Libraries," IEEE Advances in Digital Libraries, ADL May 22-24, 2000, Washington DC.
Hall, Patrick, et al., "Approximate String Matching," ACM Computing Surveys, Dec. 1980, 12(4).
Arya, Sunil, et al., "An Optimal Algorithm for Approximate Nearest Neighbor Searching in Fixed Dimensions," Journal of the ACM, Nov. 1998, 891-923, 45(6).
Berchtold, Stefan, et al., "Using Extended Feature Objects for Partial Similarity Retrieval," The VLDB Journal, Mar. 28, 1997, 333-348 (6).
Schwartz, David M., "ImaginOn Technology and Interactive Television," Imaginon—White Papers, May 11, 1998, available at http://www.imaginon.com/nn/content/white_papers/i_tv.html (last accessed Sep. 29, 2014).
Schwartz, David M. et al., "Internet Television: The Economics of Webcasting," Imaginon—White Papers, Mar. 14, 2000, available at http://www.imaginon.com/nn/content/white_papers/econ_web.html (last accessed Sep. 29, 2014).
"ImaginAuthor—Streaming Video Branching Seamlessly From Clip to Clip," ImaginOn, Inc., available at http://www.imaginon.com/imon/page5.html (last accessed Sep. 29, 2014).

"ImOn.comTV Internet Television," ImOn.comTV, available at http://www.imaginon.com/imon/page4.html (last accessed Sep. 29, 2014).
"ImOn.comTV TurnKey Package," ImOn.comTV, available at http://www.imaginon.com/imon/page1.html (last accessed Sep. 29, 2014).
"ImaginOn presents ImOn.comTV," ImOn.comTV, available at http://www.imaginon.com/imon/index1.html (last accessed Sep. 29, 2014).
Alvear, Jose., "ImOn.comTV to Debut Webcasting Solution," Streaming Media Magazine, Apr. 10, 2000, available it http://www.streamingmedia.com/Articles/ReadArticle.aspx?ArticleID=62301 (last accessed Sep. 29, 2014).
"Press Release—ImOn.comTV Technology Will Change Television Advertising Forever," ImOn.comTV, available at http://www.imaginon.com/pressrel/p1999/advertising.html (last accessed Sep. 29, 2014).
Google Inc. and YouTube, LLC's Corrected Preliminary Invalidity Contentions, *Network-1 Technologies, Inc.*, v. *Google, Inc. and YouTube, LLC*, No. 1:14-cv-02396-PGG (S.D.N.Y. Sep. 8, 2014).
Appendix 1 to Google's Responses to Network-1's Second Interrogatories dated Oct. 20, 2014.
Google Inc. and YouTube, LLC'S Responses and Objections to Plaintiff's Second Set of Interrogatories (Nos. 7-13) dated Oct. 20, 2014.
Liu et al., "An Investigation of Practical Approximate Nearest Neighbor Algorithms", Advances in Neural Information Processing Systems (NIPS) 2004.
K.L. Clarkson, "Nearest-Neighbor Searching and Metric Space Dimensions", Nearest-Neighbor Methods for Learning and Vision: Theory and Practice:, Apr. 2005.
Swaminathan et al., "Robust an Secure Image Hashing", IEEE Transactions on Information Forensics and Security, Jun. 2006, pp. 215-230, vol. 1, No. 2.
Burges et al., "Duplicate Detection and Audio Thumbnails with Audio Fingerprinting" [online]. 2004, [retrieved on Nov. 21, 2006]. Retrieved on the Internet: <URL:www.research.microsoft.com/~cburges/tech_reports/tr-2004-19.pdf>, 5 pages.
Cano et al., "A Review of Algorithms for Audio Fingerprinting" [online]. 2002, [retrieved on Nov. 21, 2006]. Retrieved from the Internet: <URL: www.iua.upf.es/mtg/publications/MMSP-2002-pcano.pdf>, 5 pages.
Haitsma and Kalker, "A Highly Robust Audio Fingerprinting System" [online]. 2002, [retrieved on Nov. 16, 2006]. Retrieved from the Internet: <url: www.ismir2002.ismir.net/proceedings/02-FP04-2.pdf>, 9 pages.
Jacobs et al., "Fast Multiresolution Image Querying" [online]. 1995, [retrieved on Nov. 21, 2006]. Retrieved from the Internet: <URL: www.grail.cs.washington.edu/projects/query.pdf>, 10 pages.
Ke et al., "Computer Vision for Music Identification" [online]. 2005, [retrieved on Nov. 21, 2006]. Retrieved from the Internet: <URL: www.cs.cmu.edu/~yke/musicretrieval/cvpr2005-mr.pdf>, 8 pages.
Shazam, Shazam Entertainment Brings Music Recognition to Windows Mobile 5.0 Powered Smartphones [online]. 2006, [retrieved on Nov. 16, 2006]. Retrieved from the Internet: <URL: www.shazam.com/music/portal/sp/s/media-type/html/user/anon/page/default/template/pages/p/company_release30.html>, 1 page.
Stanford, "CS276 Information Retrieval and Web Mining" [online]. 2005, [retrieved on Nov. 16, 2006]. Retrieved from the Internet: <URL: www.stanford.edu/class/cs276/handouts/lecture19.pdf>, 8 pages.
Stanford, "Data Mining: Associations" [online]. 2002, [retrieved on Nov. 16, 2006]. Retrieved from the Internet: <URL: www.stanford.edu/class/cs206/cs206-2.pdf>, 11 pages.
Stollnitz et al., Wavelets for Computer Graphics: A Primer, Part 1: [online]. 1995, [retrieved on Nov. 21, 2006]. Retrieved from the Internet: <URL: www.grail.cs.washington.edu/pub/stoll/wavelet1.pdf>, 8 pages.
Stollnitz et al., Wavelets for Computer Graphics: A Primer, Part 2: [online]. 1995, [retrieved on Nov. 21, 2006]. Retrieved from the Internet: <URL: www.grail.cs.washington.edu/pub/stoll/wavelet2.pdf>, 9 pages.

(56) References Cited

OTHER PUBLICATIONS

Yang, "MACS: Music Audio Characteristic Sequence Indexing for Similarity Retrieval", Oct. 21-24, 2001, New Paltz, New York.
Viola and Jones, Robust Real-Time Object Detection, Int. J. Computer Vision, 2002.
Burges et al., "Using Audio Fingerprinting for Duplicate Detection and Thumbnail Generation," Mar. 2005, 4 pages.
Lin, et al., Input Data Representation for Self-Organizing Map in Software Classification, Knowledge Acquisition and Modeling, 2009. KAM '09. Second International Symposium on vol. 2, Digital Object Identified: 10.11 09/KAM.2009.151 Publication Year 2009, pp. 360-353.
Baluja et al., "Content Fingerprinting Using Wavelets", 3rd European Conference on Visual Media Production, 2006, pp. 198-207.
Cohen et al., "Finding Interesting Associations without Support Pruning", IEEE Transactions on Knowledge and Data Engineering, 2001, pp. 64-78, vol. 13, Issue 1.
Yang, Efficient Video Identification based on locality sensitive hashing and triangle inequality, National University of Singapore, 2005, pp. 1-64.
Peter N. Yianlos, Excluded Middle Vantage Point Forests for Nearest Neighbor Search, Jul. 20, 1998, pp. 1-12.
Peter N. Yianlos,, "Locally Lifting the Curse of Dimensionality for Nearest Neighbor Search" SODA 2000, pp. 361-370.
L. Baum et al., "A Maximization Technique Occuring in the Statistical Analysis of Probabilistic Functions of Markov Chains," The Annals of Mathematical Statistics, vol. 41, No. 1, pp. 164-171 (1970).
A. P. Dempster et al., "Maximum Likelihood from Incomplete Data via the $EM$ Algorithm," Journal of the Royal Statistical Society, Series B (Methodological), vol. 39, Issue 1, pp. 1-38 (1977).
D. Reynolds et al., "Robust Text-Independent Speaker Identification Using Gaussian Mixture Speaker Models," IEEE Transactions on Speech and Audio Processing, vol. 3, No. 1, pp. 72-83 (Jan. 1995).
A. Djouadi and E. Bouktache, "A fast Algorithm for the nearest neighbor classifier," IEEE Transactions on Pattern Analysis and Machine Intelligence, Mar. 1997, pp. 277-282.
Nene et al., "A simple algorithm for nearest neighbor search in high dimensions," IEEE Transactions on Pattern Analysis and Machine Intelligence, Sep. 1997, pp. 989-1003.
Sunil Arya et al., "Approximate Nearest Neighbor Queries in Fixed Dimensions," Proceedings of the 4th annual ACM-SIAM Symposium on Discrete algorithms, 1993, pp. 271-280.
K. Fukunaga et al., A branch and bound algorithm for computing k-nearest neighbors, IEEE Trans. Comput., C24:750-753, Jul. 1975.
Charles D. Feustel et al., "The nearest neighbor problem in an abstract metric space," Pattern Recognition Letters, pp. 125-128, Dec. 1982.
Dennis Shasha et al., "New Techniques for Best-Match Retrieval," ACM Transactions on Information Systems, 8(2); 140{158, Apr. 1990.
J. Uhlmann, "Satisfying general proximity / similarity queries with metric trees", Information Processing Letters, 40 (4): 175{9, Nov. 1991.
Sergey Brin, "Near Neighbor Search in Large Metric Spaces," Proceedings of the 21st VLDB Conference, Zurich, Switzerland, Sep. 1995.
Daniel P. Huttenlocher, et al., "Comparing Images Using the Hausdorff Distance," IEEE Transactions on Pattern Analysis and Machine Intelligence, vol. 15, No. 9, pp. 850-863, Sep. 1993.
Thomas Seidl et al., "Optimal Multi-Step K-Nearest Neighbor Search," Proceedings of ACM SIGMOD International Conference of Management of Data, Jun. 1998, pp. 154-165.
W. A. Burkhard et al., "Some Approaches to Best-Match File Searching," Communications of the ACM, vol. 16, No. 4, Apr. 1973.
Eyal Kushilevitz et al., "Efficient Search for Approximate Nearest Neighbor in High Dimensional Spaces," Proceedings of the 30th annual ACM Symposium on the Theory of computing, 1998, pp. 457-474, vol. 30, No. 2.

J. Nievergelt et al., "The Grid File: An Adaptable, Symmetric Multikey File Structure," ACM Transactions on Database Systems, vol. 9, No. 1, pp. 38-71 (Mar. 1984).
Nevin Heintze, "Scalable Document Fingerprinting," Proc. USENiX Workshop on Electronic Commerce (1996).
Erling Wold et al., "Content-Based Classification, Search, and Retrieval of Audio," IEEE Multimedia, vol. 3, Issue 3, pp. 27-63 (1996).
Bir Bhanu et al., "Learning Feature Relevance and Similarity Metrics in Image Databases," Proceedings of the IEEE Workshop on Content-Based Access of Image and Video Libraries, pp. 14-19 (1998).
A. Del Bimbo et al., "Using Weighted Spatial Relationships in Retrieval by Visual Contents," Image Description and Retrieval, pp. 161-192 (1998).
P. Indyk et al., "Approximate Nearest Neighbors: Towards Removing the Curse of Dimensionality," Proceeding of the Thirtieth Annual ACM Symposium on Theory of Computing, pp. 604-613 Jul. 21, 1999.
Marco La Cascia, "Combining Textual and Visual Cues for Content-based Image Retrieval on the World Wide Web," Proceedings of the IEEE Workshop on Content-Based Access of Image and Video Libraries, pp. 24-29 (1998).
Atsuo Yoshitaka et al., "A Survey on Content-Based Retrieval for Multimedia Databases," IEEE Transactions on Knowledge and Data Engineering, vol. 11, No. 1, pp. 81-93 (Jan./Feb. 1999).
Steve Lawrence et al., "Digital Libraries and Automonous Citation Indexing," IEEE Computer, pp. 67-71 (Jun. 1999).
Akisato Kimura et al., "Very Quick Audio Searching: Introducing Global Pruning to the Time-Series Active Search," IEEE Conf on Acoustics, Speech and Signal Processing, (ICASSP '01), vol. 3, pp. 1429-1432, 2001.
Edgar Chavez et al., "Searching in Metric Spaces," ACM Computing Surveys, vol. 33, No. 3, pp. 273-321 (Sep. 2001).
Jaap Haitsma et al., "Robust Audio Hashing for Content Identification," Workshop on Content Based Multimedia Indexing, Brescia, Italy (Sep. 19-21, 2001).
Jaap Haitsma et al., "A Highly Robust Audio Fingerprinting System," Journal of New Music Research, 1744-5027, vol. 32, Issue 2, pp. 211-221 (2003).
Saul Schleimer et al., "Winnowing: Local Algorithms for Document Fingerprinting," ACM SIGMOD, Jun. 9-12, 2003.
Edward Chang et al., "Searching Near-Replicas of Images via Clustering," SPIE Symposium of Voice, Video and Data Communications, 1999.
Edward Y. Chang et al., "RIME: A Replicated Image Detector for the World-Wide Web," SPIE, 1998.
Hector Garcia-Molina et al., "Safeguarding and Charging for Information on the Internet," Proceedings of ICDE, 1998.
Sergey Brin et al., "Copy Detection Mechanisms for Digital Documents," Proceedings of ACM SIG-MOD, May 1995.
Stefan Berchtold "The x-tree: An Index Structure for High-Dimensional Data," Proceedings of the 22nd VLDB, Aug. 1996.
Norio Katayama et al., "The SR-tree: An Index Structure for High-Dimensional Nearest Neighbor Queries," Proceedings of ACM SIGMOD, May 1997.
John T. Robinson, "The K-D-B-Tree: A Search Structure for Large Multidimensional Dynamic Indexes," Proceedings of ACM SIGMOD, Apr. 1981.
Myron Flickner et al., "Query by Image and Video Content: The QBIC System," IEEE Computer 28(9), pp. 23-32, 1995.
Amarnath Gupta et al., "Visual Information Retrieval," Communications of the ACM, vol. 40, No. 5, pp. 69-79, May 1997.
John R. Smith et al., "VisualSEEk: A fully automated content-based image query system," ACM Multimedia Conference, 1996.
David A. White et al., "Similarity Indexing: Algorithms and Performance," Proc. SPIE, vol. 2670, San Diego, 1996.
Norbert Beckmann et al., "The R*-tree: An Efficient and Robust Access Method for Points and Rectangles," Proceedings of ACM Sigmod, May 1990.
A. Guttman, "R-Trees: A Dynamic Index Structure for Spatial Searching," Proceedings of ACM Sigmod, Jun. 1984.

(56) References Cited

OTHER PUBLICATIONS

David A. White et al., "Similarity Indexing with the SS-tree*," Proceedings of the 12th ICDE, Feb. 1996.
King Lin et al., "The TV-Tree: An Index Structure for High-Dimensional Data," VLDB, Journal 3, No. 4, 1994, pp. 517-542.
Paolo Ciaccia et al., "M-tree: An Efficient Access Method for Similarity Search in Metric Spaces," Proceedings of the 23rd VLDB, Aug. 1997.
Nick Roussopoulos et al., Nearest Neighbor Queries, Proceedings of ACM Sigmod, May 1995.
C. Li et al., "An extensible hashing index for high-dimensional similarity search," Stanford Techncial Report, Aug. 1998.
Jon M. Kleinberg, "Two Algorithms for Nearest-Neighbor Search in High Dimensions," Proc 29th STOC, Feb. 7, 1997.
Adams, Open Cable Architecture (Cisco Press 2000), Chapter 8-16.
ATSC Standard: Program and System Information Protocol for Terrestrial Broadcast and Cable (PSIP) (Dec. 23, 1997).
Attack of the $500 Killer Network Computers: Time-Warner Cable's Full Service Network, Network Computing (Aug. 19, 2000) Internet Archive, https://web.archive.org/web/20000819050301/http://www.networkcomputing.com/616/616tw.html.
Full Service Network and The Orlando Sentinel add interactive dining guide to GOtv, The Free Library, http://www.thefreelibrary.com/Full+Service+Network+and+The+Orlando+Sentinel+add+interactive+dining...-a018299720 (published May 20, 1996, last visited Mar. 4, 2015).
Full Service Network(FSN) in Orlando, Florida, Hong Kong University of Science and Technology (May 4, 1997) Internet Archive, https://web.archive.org/web/19970504203603/http://www.ust.hk/~webiway/content/USA/Trial/fsn.html.
Full Service Network, Time Warner Cable, http://m.history.timewarnercable.com/the-twc-story/era-1990-1995/Story.aspx?story=56 (last visited Mar. 4, 2015).
Time Warner Cable, DRAFT Asset Distribution System ("Catcher's Mitt") Functional Requirements, Version 1.0 (Jan. 26, 2000).
Time Warner Cable, Request for Proposal and Functional Requirements Specification for Video-On-Demand (VOD) Systems, Version 2.0 (Apr. 25, 1997).
Time Warner Cable's Full Service Network connects live to Innoventions, AllBusiness (published Apr. 10, 1996, archived Mar. 25, 2008) Internet Archive, https://web.archive.org/web/20080325024937/http://www.allbusiness.com/media-telecommunications/telecommunications/7218809-1.html.
Time Warner introduces world's first full service network in Orlando; Network offers First . . . , AllBusiness (published Dec. 14, 1994, archived May 22, 2009) Internet Archive, https://web.archive.org/web/20090522134441/http://www.allbusiness.com/media-telecommunications/telecommunications/7087127-1.html.
Time Warner will close its Full Service Network, Orlando Business Journal, http://www.bizjournals.com/orlando/stories/1997/04/28/daily7.html (last visited Mar. 4, 2015).
Time Warner's 'Time Machine' for Future Video, The New York Times, http://www.nytimes.com/.../12/business/time-warner-s-time-machine-for-future-video.html?pagewanted=2&pagewanted=print (publsihed Dec. 12, 1994, last visited Mar. 4, 2015).
The Industry Standard, Web Entertainment Gets Personal, S. Rosenbaum, Jan. 10-17, 2000, www.thestandard.com.
U.S. Appl. No. 60/188,082, filed Mar. 9, 2000.
Duda et al., Pattern Classification, 2nd Edition, John Wiley & Sons, Inc., 2001.
Chang et al., Searching Near-Replicas of Images via Clustering, SPIE Symposium of Voice, Video, and Data Communications, 1999.
Fukunaga et al., A Branch and Bound Algorithm for Computing k-Nearest Neighbors, IEEE Transactions on Computers, Jul. 1975, pp. 750-753, vol. 24, No. 7.
Fukunaga, Introduction to Statistical Pattern Recognition, 2nd Edition, Academic Press Inc., San Diego, CA, 1990.
Ester et al., A Density-Based Algorithm for Discovering Clusters in Large Spatial Databases with Noise, KDD-96 Proceedings, 1996.
Salton et al., Generation and Search of Clustered Files, Cornell University, Technical Report 77-299, 1977.
Tishby et al., The Information Bottleneck Method, Sep. 30, 1999.
Yianilos, Excluded Middle Vantage Point Forests for Nearest Neighbor Search, Jul. 20, 1998, revised Aug. 1, 1999.
Brin Sergey et al. "Copy Detection Mechanisms for Digital Documents" Proc. of ACM SIGMOD 44 Annual Conf. (San Jose 1995) http://www-db.stanford.edu/~sergey/copy.html on Nov. 27, 2000 21 pages.
Broder Andrei Z. "Some applications of Rabin's fingerprinting method" R. Capocelli A. 47 DeSantis U. Vaccaro Eds; Sequences II: Methods in Communications Security and Computer Science pp. 143-152 (Springer-Verlag 1993) 10 pages.
Ardizzone, Edoardo et al., "Motion and Color-Based Video Indexing and Retrieval," Universita di palermo, Departimento di Ingegneria Elettrica, pp. 135-139, Viale delle Scienze, Palermo, Italy, IEEE 1996.
Deng, Yining et al., "Content-based Search of Video Using Color, Texture, and Motion," Dept. of Electrical and Computer Engineering, University of California, Santa Barbara, CA, pp. 534-537, IEEE 1997.
Fang, Min et al., "Computing Iceberg Queries Efficiently," Dept. of Computer Science, Stanford, CA, Paper No. 234, pp. 1-25.
Flickner, Myron et al., "Query by Image and Video Content: The QBIC System," IBM Almaden Research Center, Sep. 1995, pp. 23-32, IEEE 1995.
Gargi, U et al., "Performance Characterization and Comparison of Video Indexing Algorithms," Dept. of Computer Science & Engineering, The Pennsylvania State University, University Park, PA.
Gionis, Aristides et al., "Similarity Search in High Dimensions via Hashing," Dept. of Computer Science, Stanford University, Stanford, CA, pp. 518-529, Proceeding of the 25th VLDB Conference, Edinburgh, Scotland, 1999.
Indyk, Piotr et al., "Approximate Nearest Neighbors: Towards Removing the Curse of Dimensionality" (preliminary version) Dept. of Computer Science, Stanford University, Stanford, CA, pp. 1-13 & i-vii, Jul. 21, 1999.
Iyengar, Giridharan et al., "Models for automatic classification of video sequences," MIT Media Laboratory, Cambridge, MA.
Jain, Anil K., et al., "Image Retrieval using Color and Shape," Dept. of Computer Science, Michigan State University, Eas Lansing, MI, pp. 1-24, May 15, 1995.
Ogle, Virginia E., et al., "Chabot: Retrieval from a Relational Database of Images," University of California at Berkeley, Computer pp. 40-48, IEEE 1995.
Pentland, A. et al., "Photobook: Content-Based Manipulation of Image Databases," Perceptual Computing Section, The Media Laboratory, Massachusetts Institute of Tech., International Journal of Computer Vision 18(3), pp. 233-254 (1996), 1996 Kluwer Academic Publishers. Manuf. in The Netherlands.
Shivakumar, Narayanan et al., "SCAM: A Copy Detection Mechanism for Digital Documents," Dept. of Computer Science, Stanford University, Stanford, CA, pp. 1-13.
Shivakumar, Narayanan et al., "Building a Scalable and Accurate Copy Detection Mechanism," Dept. of Computer Science, Stanford University, Stanford, CA.
Srihari, Rohini K., "Automatic Indexing and Content-Based Retrieval of Captioned Images," State University of New York, Buffalo, Theme Feature, pp. 49-56, Sep. 1995, IEEE 1995.
Swain, Michael and Ballard, Dana H., "Color Indexing," International Journal of Computer Vision 7:1, p. 11-32 (1991), 1991 Kluwer Academic Publishers. Manuf. in The Netherlands.
Wactlar, Howard D. et al., "Intelligent Access to Digital Video: Informedia Project," Carnegie Mellon University, Digital Library Initiative: Carnegie Mellon University, Computer, pp. 46-52, IEEE 1996.
Yeo, Boon-Lock et al., "Rapid Scene Analysis on Compressed Video," IEEE Transactions on Circuits and Systems for Video Technology, vol. 5, No. 6, pp. 533-544, Dec. 1995, Dept. of Electrical Engineering, Princeton University, Princeton, NJ, IEEE Log No. 9415901.

(56) References Cited

OTHER PUBLICATIONS

Indyk, Piotr et al., "Finding pirated video sequences on the Internet," Dept. of Computer Science, Stanford University, Palo Alto, CA, Paper No. 199.
U.S. Appl. No. 60/133,247, filed May 5, 1999.
U.S. Appl. No. 60/155,064, filed Sep. 21, 1999.
U.S. Appl. No. 60/218,824, filed Jul. 18, 2000.
Indyk, Piotr et al., "Locality-Preserving Hashing in Multidimensional Spaces," Feb. 25, 1997.
Gibson, David, "Name That Clip: Music retrieval using audio clips," Aug. 19, 1999.
Declaration of David A. Gibson, Inter Partes Review of U.S. Pat. No. 7,174,293, Aug. 30, 2013.
Declaration of David A. Gibson, Inter Partes Review of U.S. Pat. No. 7,783,489, Aug. 30, 2013.
Intersil, "Glossary of Communication Terms," Dec. 1996.
Declaration of Dr. Ton Kalker, Inter Partes Review of U.S. Pat. No. 7,174,293, Aug. 30, 2013.
Declaration of Dr. Ton Kalker, Inter Partes Review of U.S. Pat. No. 7,783,489, Aug. 30, 2013.
U.S. Appl. No. 60/222,023, filed Jul. 31, 2000; Avery Li-Chun Wang and Julius O. Smith III, Inventors; Palo Alto, CA.
Martin Ester et al., "A Density-Based Algorithm for Discovering Clusters in Large Spatial Databases with Noise," Proceedings of 2nd International Conference on Knowledge Discovery and Data Mining (KDD-96), 1996.
Yossi Rubner et al., "Adaptive Color Image Embeddings for Database Navigation," Proceedings of the 1998 IEEE Asian Conference on Computer Vision.
Roger Weber et al., "A Quantitative Analysis and Performance Study for Similarity-Search Methods in High-Dimensional Spaces," Proceedings of 24th VLDB Conference, 1998.
P. Yianilos, "Data Structures and Algorithms for Nearest Neighbor Search in General Metric Spaces," Proceedings of the ACM-SIAM Symposium on Discrete algorithms, 1993, pp. 311.321.
U.S. Appl. No. 60/304,647, filed Jul. 10, 2001.
U.S. Appl. No. 60/281,881, filed Apr. 5, 2001.
Sakata et al., Metadata Mediation: Representation and Protocol, Digital Vision Laboratories, 7-3-37 Akasaka, Minato, Tokyo, Japan.
U.S. Appl. No. 13/800,573, filed Mar. 13, 2013.
U.S. Appl. No. 13/800,890, filed Mar. 13, 2013.
U.S. Appl. No. 13/829,717, filed Mar. 14, 2013.
U.S. Appl. No. 13/830,447, filed Mar. 14, 2013.
U.S. Appl. No. 13/830,626, filed Mar. 14, 2013.
U.S. Appl. No. 13/830,986, filed Mar. 14, 2013.
U.S. Appl. No. 13/842,068, filed Mar. 15, 2013.
U.S. Appl. No. 13/338,079, filed Dec. 27, 2011.
U.S. Appl. No. 60/134,782, filed May 19, 1999.
U.S. Appl. No. 60/193,948, filed Mar. 31, 2000.
U.S. Appl. No. 60/195,535, filed Apr. 7, 2000.
U.S. Appl. No. 60/206,384, filed May 23, 2000.
U.S. Appl. No. 60/221,843, filed Jul. 28, 2000.
Fingerprint Identification Technology in Civil Applications, Sagem Morpho, Inc. (published 1998) Internet Archive (Aug. 4, 2001), http://web.archive.org/web/20010804045334/http://www.morpho.com/news_room/library/whitepapers/civil_afis.htm.
Google's Third Supplemental Interrogatory Responses, Nos. 2, 6-7, 9-11 and 13, *Network-1 Technologies, v. Google, Inc . et al.*, No. 1:14-cv-02396 (S.D.N.Y. May 14, 2015).
Decision Instituting Inter Partes Review, *Google Inc. v. Network-1 Technologies, Inc.*, No. IPR2015-00343 (PTAB Jun. 23, 2015), re U.S. Pat. No. 8,640,179.
Google Inc. and YouTube, LLC's Preliminary Invalidity Contentions, *Network-1 Technologies, Inc. v. Google, Inc. and YouTube, LLC*, No. 1:14-cv-09558 (S.D.N.Y. Jun. 18, 2015).
Decision Instituting Inter Partes Review, *Google Inc. v. Network-1 Technologies, Inc.*, No. IPR2015-00345 (PTAB Jun. 23, 2015), re U.S. Pat. No. 8,205,237.
Decision Instituting Inter Partes Review, *Google Inc. v. Network-1 Technologies, Inc.*, No. IPR2015-00347 (PTAB Jun. 23, 2015), re U.S. Pat. No. 8,010,988.
Decision Instituting Inter Partes Review, *Google Inc. v. Network-1 Technologies, Inc.*, No. IPR2015-00348 (PTAB Jun. 23, 2015), re U.S. Pat. No. 8,656,441.
Transcript of Deposition of Pierre Moulin, PhD, vol. I (Aug. 19, 2015), *Google Inc. v. Network-1 Technologies, Inc.*, No. IPR2015-00347 (PTAB filed Dec. 3, 2014), re U.S. Pat. No. 8,010,988.
Transcript of Deposition of Pierre Moulin, PhD, vol. II (Aug. 20, 2015), *Google Inc. v. Network-1 Technologies, Inc.*, No. IPR2015-00347 (PTAB filed Dec. 3, 2014), re U.S. Pat. No. 8,010,988.
Declaration of Dr. George Karypis, *Google Inc. v. Network-1 Technologies, Inc.*, No. IPR2015-00343 (PTAB Jun. 23, 2015), re U.S. Pat. No 8,640,179.
Rudolf F. Graf, Modern Dictionary of Electronics, 425-426 (7th ed. 1999).
Nearest Neighbor Search, Wikipedia, available at http://en.wikipedia.org/wiki/Nearest_neighbor_search (last accessed Sep. 10, 2015).
Big O notation, Wikipedia, available at http://en.wikipedia.org/wiki/Big_O_notation (last accessed Sep. 15, 2015).
U.S. Appl. No. 60/147,029.
"Apple Unveils New QuickTime Version," AP (Associated Press) Online, Apr. 20, 1999.
"Form-based Device Input and Upload in HTML," W3C Note, Jul. 6, 1999, available at http://www.w3.org/1999/07/NOTE-device-upload-19990706.
"Novel Commercials in video Debut," Broadcasting, p. 10, Jul. 7, 1941, available at http://www.americanradiohistory.com/Archive-BC/BC-1941/1941-07-07-BC.pdf.
"VDO expands Webcasting possibilities", Broadcasting & Cable, Nov. 11, 1996.
Alex Bracetti, "The 80 Best Gadgets of the '80s," Complex Media, Aug. 19, 2013, available at http://www.complex.com/pop-culture/2013/08/best-gadgets-of-the-80s/.
Bill Carter, "ABC's 'Home Videos' Pays Off Big," NY Times, Feb. 19, 1990, available at http://www.nytimes.com/1990/02/19/business/abc-s-home-videos-pays-off-big.html.
Bruce and Marge Brown, "POPcast, Post and view audio on the Web—free," PC Magazine, Dec. 29, 1999.
Business Wire, "Ivex Announces ViewOps Internet Video Service; Allows Business Managers to View and Manage Operations Online," May 2, 2000.
E. Nebel & L. Masinter, "Form-based File Upload in HTML," Nov. 1995, available at http://www.ietf.org/rfc/rfc1867.txt.
Early Television Museum, "Early Television Stations", available at http://www.earlytelevision.org/w6xao.html.
Jose Alvear, "Web Developer.com Guide to Streaming Multimedia", Chapters 9 and 11, 1998.
Leland, Jon, "Online Video Service Shortcuts," Videography, Mar. 1999, 24, 3 (ABI/INFORM Professional Advanced), pp. 150-154.
RealServer Administration Guide, Version 5.0, 1997.
Trends, Digital Video, "Hollywood Goes to the Web," PC Magazine, Jun. 22, 1999.
Videomaker.com, "Laundromat, Fotomat . . . Streaming Videomat?," Apr. 15, 1999.
Opening Brief of Appellant Google Inc., *Google Inc. v. Network-1 Technologies, Inc.*, Case No. 17-1379 in the U.S. Court of Appeals for the Federal Circuit, Doc. 16, Apr. 14, 2017, 112 pages.
Brief for Appellee Network-1 Technologies, Inc., *Google Inc. v. Network-1 Technologies, Inc.*, Case No. 17-1379 in the U.S. Court of Appeals for the Federal Circuit, Doc. 24, Jun. 16, 2017, 72 pages.
Brief of Cross-Appellant and Appellee Network-1 Technologies, Inc., *Google Inc. v. Network-1 Technologies, Inc.*, Case No. 16-2509 in the U.S. Court of Appeals for the Federal Circuit, Doc. 30, Feb. 8, 2017, 73 pages.
Reply Brief of Appellant Google Inc., *Google Inc. v. Network-1 Technologies, Inc.*, Case No. 16-2509 in the U.S. Court of Appeals for the Federal Circuit, Doc. 36, Mar. 22, 2017, 34 pages.

(56) References Cited

OTHER PUBLICATIONS

Reply Brief for Appellant Google Inc., *Google Inc. v. Network-1 Technologies, Inc.*, Case No. 17-1379 in the U.S. Court of Appeals for the Federal Circuit, Doc. 27, Jun. 30, 2017, 34 pages.

\* cited by examiner

METHODS FOR USING EXTRACTED FEATURE VECTORS TO PERFORM AN ACTION ASSOCIATED WITH A PRODUCT

§ 0. RELATED APPLICATIONS

The present application is a continuation of U.S. patent application Ser. No. 14/981,219 (incorporated herein by reference, issued as U.S. Pat. No. 9,538,216 on Jan. 3, 2017), titled "SYSTEM FOR TAKING ACTION WITH RESPECT TO A MEDIA WORK," filed on Dec. 28, 2015, and listing Ingemar J. Cox as the inventor, which is a continuation of U.S. patent application Ser. No. 13/830,986 (incorporated herein by reference, issued as U.S. Pat. No. 9,282,359 on Mar. 8, 2016), titled "METHOD FOR TAKING ACTION WITH RESPECT TO AN ELECTRONIC MEDIA WORK," filed on Mar. 14, 2013, and listing Ingemar J. Cox as the inventor, which is a continuation of U.S. patent application Ser. No. 13/800,573 (incorporated herein by reference, issued as U.S. Pat. No. 8,904,464 on Dec. 2, 2014), titled "METHOD FOR TAGGING AN ELECTRONIC MEDIA WORK TO PERFORM AN ACTION," filed on Mar. 13, 2013, and listing Ingemar J. Cox as the inventor, which is a continuation of U.S. patent application Ser. No. 13/338,079 (incorporated herein by reference, issued as U.S. Pat. No. 8,640,179 on Jan. 28, 2014), titled "METHOD FOR USING EXTRACTED FEATURES FROM AN ELECTRONIC WORK," filed on Dec. 27, 2011, and listing Ingemar J. Cox as the inventor, which is a continuation of U.S. patent application Ser. No. 11/977,202 (incorporated herein by reference, issued as U.S. Pat. No. 8,205,237 on Jun. 19, 2012), titled "IDENTIFYING WORKS, USING A SUB-LINEAR TIME SEARCH, SUCH AS AN APPROXIMATE NEAREST NEIGHBOR SEARCH, FOR INITIATING A WORK-BASED ACTION, SUCH AS AN ACTION ON THE INTERNET", filed Oct. 23, 2007, and listing Ingemar J. Cox as the inventor, which is a continuation of U.S. patent application Ser. No. 11/445,928 (incorporated herein by reference, issued as U.S. Pat. No. 8,010,988 on Aug. 30, 2011), titled "USING FEATURES EXTRACTED FROM AN AUDIO AND/OR VIDEO WORK TO OBTAIN INFORMATION ABOUT THE WORK," filed on Jun. 2, 2006, and listing Ingemar J. Cox as the inventor, which is a continuation-in-part of U.S. patent application Ser. No. 09/950,972 (incorporated herein by reference, issued as U.S. Pat. No. 7,058,223 on Jun. 6, 2006), titled "IDENTIFYING WORKS FOR INITIATING A WORK-BASED ACTION, SUCH AS AN ACTION ON THE INTERNET," filed on Sep. 13, 2001, and listing Ingemar J. Cox as the inventor, which application claims benefit to the filing date of provisional patent application Ser. No. 60/232,618 (incorporated herein by reference), titled "IDENTIFYING AND LINKING TELEVISION, AUDIO, PRINT AND OTHER MEDIA TO THE INTERNET", filed on Sep. 14, 2000 and listing Ingemar J. Cox as the inventor.

§ 1. BACKGROUND OF THE INVENTION

§ 1.1 Field of the Invention

The present invention concerns linking traditional media to new interactive media, such as that provided over the Internet for example. In particular, the present invention concerns identifying a work (e.g., content or an advertisement delivered via print media, or via a radio or television broadcast) without the need to modify the work.

§ 1.2 Related Art

§ 1.2.1 Opportunities Arising from Linking Works Delivered Via Some Traditional Media Channel or Conduit to a More Interactive System The rapid adoption of the Internet and associated World Wide Web has recently spurred interest in linking works, delivered via traditional media channels or conduits, to a more interactive system, such as the Internet for example. Basically, such linking can be used to (a) promote commerce, such as e-commerce, and/or (b) enhance interest in the work itself by facilitating audience interaction or participation. Commerce opportunities include, for example, facilitating the placement of direct orders for products, providing product coupons, providing further information related to a product, product placement, etc.

In the context of e-commerce, viewers could request discount vouchers or coupons for viewed products that are redeemable at the point of purchase. E-commerce applications also extend beyond advertisements. It is now common for television shows to include product placements. For example, an actor might drink a Coke rather than a Pepsi brand of soda, actors and actresses might wear designer-labeled clothing such as Calvin Klein, etc. Viewers may wish to purchase similar clothing but may not necessarily be able to identify the designer or the particular style directly from the show. However, with an interactive capability, viewers would be able to discover this and other information by going to an associated Web site. The link to this Web site can be automatically enabled using the invention described herein.

In the context of facilitating audience interaction or participation, there is much interest in the convergence of television and computers. Convergence encompasses a very wide range of capabilities. Although a significant effort is being directed to video-on-demand applications, in which there is a unique video stream for each user of the service, as well as to transmitting video signals over the Internet, there is also interest in enhancing the television viewing experience. To this end, there have been a number of experiments with interactive television in which viewers can participate in a live broadcast. There are a variety of ways in which viewers can participate. For example, during game shows, users can answer the questions and their scores can be tabulated. In recent reality-based programming such as the ABC television game show, "Big Brother", viewers can vote on contestants who must leave the show, and be eliminated from the competition.

§ 1.2.2 Embedding Work Identifying Code or Signals within Works

Known techniques of linking works delivered via traditional media channels to a more interactive system typically require some type of code, used to identify the work, to be inserted into the work before it is delivered via such traditional media channels. Some examples of such inserted code include (i) signals inserted into the vertical blanking interval ("VBI") lines of a (e.g., NTSC) television signal, (ii) watermarks embedded into images, (iii) bar codes imposed on images, and (iv) tones embedded into music.

The common technical theme of these proposed implementations is the insertion of visible or invisible signals into the media that can be decoded by a computer. These signals can contain a variety of information. In its most direct form, the signal may directly encode the URL of the associated Web site. However, since the alphanumeric string has variable length and is not a particularly efficient coding, it is more common to encode a unique ID. The computer then accesses a database, which is usually proprietary, and matches the ID with the associated web address. This database can be considered a form of domain name server, similar to those already deployed for network addresses. However, in this case, the domain name server is proprietary and the addresses are unique ID's.

There are two principal advantages to encoding a proprietary identifier into content. First, as previously mentioned, it is a more efficient use of the available bandwidth and second, by directing all traffic to a single Web site that contains the database, a company can maintain control over the technology and gather useful statistics that may then be sold to advertisers and publishers.

As an example of inserting signals into the vertical blanking interval lines of a television signal, RespondTV of San Francisco, Calif. embeds identification information into the vertical blanking interval of the television signal. The VBI is part of the analog video broadcast that is not visible to television viewers. For digital television, it may be possible to encode the information in, for example, the motion picture experts group ("MPEG") header. In the USA, the vertical blanking interval is currently used to transmit close-captioning information as well as other information, while in the UK, the VBI is used to transmit teletext information. Although the close captioning information is guaranteed to be transmitted into the home in America, unfortunately, other information is not. This is because ownership of the vertical blanking interval is disputed by content owners, broadcasters and local television operators.

As an example of embedding watermarks into images, Digimarc of Tualatin, Oreg. embeds watermarks in print media. Invisible watermarks are newer than VBI insertion, and have the advantage of being independent of the method of broadcast. Thus, once the information is embedded, it should remain readable whether the video is transmitted in NTSC, PAL or SECAM analog formats or newer digital formats. It should be more reliable than using the vertical blanking interval in television applications. Unfortunately, however, watermarks still require modification of the broadcast signal which is problematic for a number of economic, logistical, legal (permission to alter the content is needed) and quality control (the content may be degraded by the addition of a watermark) reasons.

As an example of imposing bar codes on images, print advertisers are currently testing a technology that allows an advertisement to be shown to a camera, scanner or bar code reader that is connected to a personal computer ("PC"). The captured image is then analyzed to determine an associated Web site that the PC's browser then accesses. For example, GoCode of Draper, Utah embeds small two-dimensional bar codes for print advertisements. The latter signal is read by inexpensive barcode readers that can be connected to a PC. AirClic of Blue Bell, Pa. provides a combination of barcode and wireless communication to enable wireless shopping through print media. A so-called "CueCat" reads bar codes printed in conjunction with advertisements and articles in Forbes magazine. Similar capabilities are being tested for television and audio media.

Machine-readable bar codes are one example of a visible signal. The advantage of this technology is that it is very mature. However, the fact that the signal is visible is often considered a disadvantage since it may detract from the aesthetic of the work delivered via a traditional media channel or conduit.

As an example of embedding tones into music, Digital Convergence of Dallas, Tex. proposes to embed identification codes into audible music tones broadcast with television signals.

All the foregoing techniques of inserting code into a work can be categorized as active techniques in that they must alter the existing signal, whether it is music, print, television or other media, such that an identification code is also present. There are several disadvantages that active systems share. First, there are aesthetic or fidelity issues associated with bar codes, audible tones and watermarks. More importantly, all media must be processed, before it is delivered to the end user, to contain these active signals. Even if a system is enthusiastically adopted, the logistics involved with inserting bar codes or watermarks into, say every printed advertisement, are formidable.

Further, even if the rate of adoption is very rapid, it nevertheless remains true that during the early deployment of the system, most works will not be tagged. Thus, consumers that are early-adopters will find that most media is not identified. At best, this is frustrating. At worst, the naive user may conclude that the system is not reliable or does not work at all. This erroneous conclusion might have a very adverse effect on the adoption rate.

Further, not only must there be modification to the production process, but modifications must also be made to the equipment in a user's home. Again, using the example of watermarking of print media, a PC must be fitted with a camera and watermark detection software must be installed. In the case of television, the detection of the identification signal is likely to occur at the set-top-box—this is the equipment provided by the local cable television or satellite broadcasting company. In many cases, this may require modifications to the hardware, which is likely to be prohibitively expensive. For example, the audible tone used by Digital Convergence to recognize television content, must be fed directly into a sound card in a PC. This requires a physical connection between the television and the PC, which may be expensive or at least inconvenient, and a sound card may have to be purchased.

§ 1.2.3 Unmet Needs

In view of the foregoing disadvantages of inserting an identification code into a work, thereby altering the existing signal, there is a need for techniques of identifying a work without the need of inserting an identification code into a work. Such an identification code can then be used to invoke a work-related action, such as work-related commerce methods and/or to increase audience interest by facilitating audience interaction and/or participation.

§ 2. SUMMARY OF THE INVENTION

Some embodiments consistent with the present invention provide a computer-implemented method, apparatus, or computer-executable programs for linking a media work to an action. Such embodiments might (a) extract features from the media work, (b) determine an identification of the media work based on the features extracted using a sub-linear time search, such as an approximate nearest neighbor search for example, and (c) determine an action based on the identification of the media work determined. In some embodiments consistent with the present invention, the media work is an audio signal. The audio signal might be obtained from a broadcast, or an audio file format. In other embodiments consistent with the present invention, the media work is a video signal. The video signal might be obtained from a broadcast, or a video file format.

In some of the embodiments pertaining to audio files, the audio file might be an mp3 file or some other digital representation of an audio signal. The information might include a song title, an album title, and/or a performer name.

In some of the embodiments pertaining to video files, the video file might be an MPEG file or some other digital representation of a video signal. The video file might be a video work, and the information might include a title of the video work, a director of the video work, and names of performers in the video work.

§ 3. BRIEF DESCRIPTION OF THE DRAWINGS

§ 4. DETAILED DESCRIPTION

The present invention may involve novel methods, apparatus and data structures for identifying works without the need of embedding signals therein. Once identified, such information can be used to determine a work-related action. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus, data structures and any other patentable subject matter to the extent that they are patentable.

§ 4.1 Functions

The present invention functions to identify a work without the need of inserting an identification code into a work. The present invention may do so by (i) extracting features from the work to define a feature vector, and (ii) comparing the feature vector to feature vectors associated with identified works. Alternatively, or in addition, the present invention may do so by (i) accepting extra-work information, such as the time of a query or of a rendering of the work, the geographic location at which the work is rendered, and the station that the audience member has selected, and (ii) use such extra-work information to lookup an identification of the work. In either case, an identification code may be used to identify the work.

The present invention may then function to use such an identification code to initiate a work-related action, such as for work-related commerce methods and/or to increase audience interest by facilitating audience interaction and/or participation.

§ 4.2 Embodiments

As just introduced in § 4.1 above, the present invention may use intra-work information and/or extra-work information to identify a work. Once identified, such identification can be used to initiate an action, such as an action related to commerce, or facilitating audience participation or interaction. Exemplary embodiments of the present invention, in which work is recognized or identified based on intra-work information, are described in § 4.2.1. Then, exemplary embodiments of the present invention, in which work is recognized or identified based on extra-work information, are described in § 4.2.2.

§ 4.2.1 Embodiments in which Work is Recognized Based on Intra-Work Information, Such as a Feature Vector Operations related to this embodiment are described in § 4.2.1.1 below. Then, various architectures which may be used to effect such operations are described in § 4.2.1.2.

Figure 1:
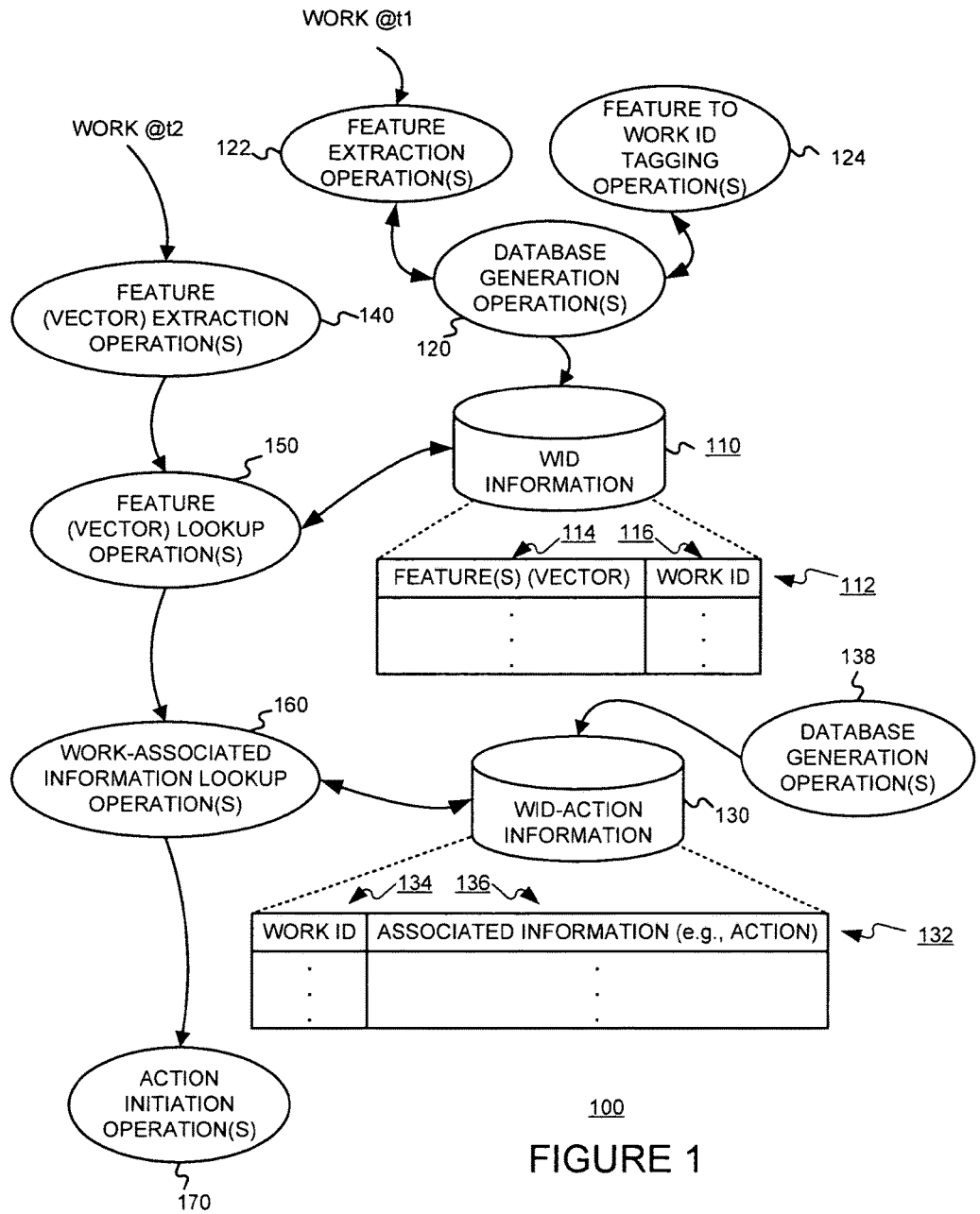
FIG. 1 is a process bubble diagram of operations that may be performed in accordance with one version of the present invention, in which intra-work information is used to identify the work.

§ 4.2.1.1 Operations and Exemplary Methods and Techniques for Effecting Such Operations FIG. 1 is a process bubble diagram of operations that may be performed in accordance with one version of the present invention, in which intra-work information is used to identify the work. As shown, a work-identification information storage 110 may include a number of items or records 112. Each item or record 112 may associate a feature vector of a work 114 with a, preferably unique, work identifier 116. The work-identification information storage 110 may be generated by a database generation operation(s) 120 which may, in turn, use a feature extraction operation(s) 122 to extract features from a work at a first time ($WORK_{@t1}$), as well as a feature-to-work identification tagging operation(s) 124.

Further, work identifier-action information storage 130 may include a number of items or records 132. Each item or record 132 may associate a, preferably unique, work identifier 134 with associated information 136, such as an action for example. The work identifier-action information storage 130 may be generated by a database generation operation(s) 138 which may, for example, accept manual entries.

As can be appreciated from the foregoing, the work-information storage 110 records 112 and the work identification-action 130 records 132 can be combined into a single record. That is, there need not be two databases. A single database is also possible in which the work identifier, or a feature vector extracted from the work, serves as a key and the associated field contains work-related information, such as a URL for example.

The feature extraction operation(s) 140 can accept a work, such as that being rendered by a user, at a second time ($WORK_{@t2}$), and extract features from that work. The extracted features may be used to define a so-called feature vector.

The extracted features, e.g., as a feature vector, can be used by a feature (vector) lookup operation(s) 150 to search for a matching feature vector 114. If a match, or a match within a predetermined threshold is determined, then the associated work identifier 116 is read.

The read work identifier can then be used by a work-associated information lookup operation(s) 160 to retrieve associated information, such as an action, 136 associated with the work identifier. Such information 136 can then be passed to action initiation operation(s) 170 which can perform some action based on the associated information 136.

§ 4.2.1.1.1 Exemplary Techniques for Feature Extraction

When the user initiates a request, the specific television or radio broadcast or printed commercial, each of which is referred to as a work, is first passed to the feature extraction operation. The work may be an image, an audio file or some portion of an audio signal or may be one or more frames or fields of a video signal, or a multimedia signal. The purpose of the feature extraction operation is to derive a compact representation of the work that can subsequently be used for the purpose of recognition. In the case of images and video, this feature vector might be a pseudo-random sample of pixels from the frame or a low-resolution copy of the frame or the average intensities of n.times.n blocks of pixels. It might also be a frequency-based decomposition of the signal, such as produced by the Fourier, wavelet and or discrete cosine transforms. It might involve principal component analysis. It might also be a combination of these. For television and audio signals, recognition might also rely on a temporal sequence of feature vectors. The recognition literature contains many different representations. For block-based methods, blocks may be accessed at pseudo-random locations in each frame or might have a specific structure. For audio, common feature vectors are based on Fourier frequency decompositions, but other representations are possible. See, e.g., R. O. Duda and P. E. Hart, Pattern Classification and Scene Analysis (Wiley-Interscience, New York, 1973). See also K. Fukunaga, Introduction to Statistical Pattern Recognition, 2nd Ed. (Academic Press, New York, 1990). (These references are incorporated herein by reference.)

As previously stated, one object of the vector extraction stage is to obtain a more concise representation of the frame. For example, each video frame is initially composed of 480.times.720 pixels which is equivalent to 345,600 pixels or 691,200 bytes. In comparison, an exemplary feature vector might only consist of 1 Kbyte of data.

A second purpose of the feature extraction process is to acquire a representation that is robust or invariant to possible noise or distortions that a signal might experience. For example, frames of a television broadcast may experience a small amount of jitter, i.e., horizontal and or vertical translation, or may undergo lossy compression such as by MPEG-2. It is advantageous that these and other processes do not adversely affect the extracted vectors. For still images there has been considerable work on determining image properties that are invariant to affine and other geometric distortions. For example, the use of Radon and Fourier-Mellin transforms have been proposed for robustness against rotation, scale and translation, since these transforms are either invariant or bare a simple relation to the geometric distortions. See, e.g., C. Lin, M. Wu, Y. M. Lui, J. A. Bloom, M. L. Miller, I. J. Cox, "Rotation, Scale, and Translation Resilient Public Watermarking for Images," IEEE Transactions on Image Processing (2001). See also, U.S. Pat. Nos. 5,436,653, 5,504,518, 5,582,246, 5,612,729, and 5,621,454. (Each of these references is incorporated herein by reference.)

§ 4.2.1.1.2 Exemplary Techniques for Database Generation and Maintenance

A number of possibilities exist for generating and maintaining work identification (WID) and identification-action translation (WIDAT) databases. However, in all cases, works of interest are processed to extract a representative feature vector and this feature vector is assigned a unique identifier. This unique identifier is then entered into the work identification (WID) database 110 as well as into the WIDAT database 130 together with all the necessary associated data. This process is referred to as tagging. For example, in the case of an advertisement, the WIDAT database 130 might include the manufacturer (Ford), the product name (Taurus), a product category (automotive) and the URL associated with the Ford Taurus car together with the instruction to translate the query into the associated URL.

The determination of all works of interest and subsequent feature vector extraction and tagging depends on whether content owners are actively collaborating with the entity responsible for creating and maintaining the database. If there is no collaboration, then the database entity must collect all works of interest and process and tag them. While this is a significant effort, it is not overwhelming and is certainly commercially feasible. For example, competitive market research firms routinely tabulate all advertisements appearing in a very wide variety of print media. Newspapers and magazines can be scanned in and software algorithms can be applied to the images to identify likely advertisements. These possible advertisements can then be compared with advertisements already in the WID database 110. If there is a match, nothing further need be done. If there is not a match, the image can be sent to a human to determine if the page does indeed contain an advertisement. If so, the operator can instruct the computer to extract the representative feature vector and assign it a unique identifier. Then, the operator can insert this information into the content identification database and as well as update the corresponding WIDAT database 130 with all the necessary associated data. This is continually performed as new magazines and papers include new advertisements to maintain the databases. This is a cost to the database entity. Television and radio broadcasts can also be monitored and, in fact, broadcast monitoring is currently performed by companies such as Nielsen Media research and Competitive Media Reporting. Television and radio broadcasts differ from print media in the real-time nature of the signals and the consequent desire for real-time recognition.

In many cases, advertisers, publishers and broadcasters may wish to collaborate with the database provider. In this case, feature extraction and annotation and/or extra-work information may be performed by the advertiser, advertisement agency, network and/or broadcaster and this information sent to the database provider to update the database. Clearly, this arrangement is preferable from the database provider's perspective. However, it is not essential.

§ 4.2.1.1.3. Exemplary Techniques for Matching Extracted Features with Database Entries The extracted feature vector is then passed to a recognition (e.g., feature look-up) operation, during which, the vector is compared to entries of known vectors 114 in a content identification (WID) database 110. It is important to realize that the matching of extracted and known vectors is not equivalent to looking up a word in an electronic dictionary. Since the extracted vectors contain noise or distortions, binary search might not be possible. Instead, a statistical comparison is often made between an extracted vector and each stored vector. Common statistical measures include linear correlation and related measures such as correlation coefficient, but other methods can also be used including mutual information, Euclidean distance and Lp-norms. These measures provide a statistical measure of the confidence of the match. A threshold can be established, usually based on the required false positive and false negative rates, such that if the correlation output exceeds this threshold, then the extracted and known vectors are said to match. See, e.g., R. O. Duda and P. E. Hart, Pattern Classification and Scene Analysis (Wiley-Interscience, New York, 1973). See also, U.S. Pat. No. 3,919,474 by W. D. Moon, R. J. Weiner, R. A. Hansen and R. N. Linde, entitled "Broadcast Signal Identification System". (Each of these references is incorporated herein by reference.)

If binary search was possible, then a database containing N vectors would require at most log(N) comparisons. Unfortunately, binary search is not possible when taking a noisy signal and trying to find the most similar reference signal. This problem is one of nearest neighbor search in a (high-dimensional) feature space. In previous work, it was not uncommon to perform a linear search of all N entries, perhaps halting the search when the first match is found. On average, this will require N/2 comparisons. If N is large, this search can be computationally very expensive.

Other forms of matching include those based on clustering, kd-trees, vantage point trees and excluded middle vantage point forests are possible and will be discussed in more detail later. See, e.g., P. N. Yianilos "Excluded Middle Vantage Point Forests for nearest Neighbor Search", Presented at the Sixth DIMACS Implementation Challenge: Near Neighbor Searches workshop, (Jan. 15, 1999). See also, P. N. Yianilos, "Locally lifting the curse of Dimensionality for nearest Neighbor Search" SODA 2000: 361-370. (Each of these references is incorporated herein by reference.) Thus, for example, a sub-linear search time can be achieved. Unlike the kd-tree method which finds the nearest neighbor with certainty, randomized constructions, like the one described in P. N. Yianilos, "Locally lifting the curse of Dimensionality for nearest Neighbor Search" SODA 2000: 361-370, that succeed with some specified probability may be used. One example of a sub-linear time search is an approximate nearest neighbor search. A nearest neighbor search always finds the closest point to the query. An approximate nearest neighbor search does not always find the closest point to the query. For example, it might do so with some probability, or it might provide any point within some small distance of the closest point.

If the extracted vector "matches" a known vector in the content identification database, then the work has been identified. Of course, there is the risk that the match is incorrect. This type of error is known as a false positive. The false positive rate can be reduced to any desired value, but at the expense of the false negative rate. A false negative occurs when the vector extracted from a work is not matched to the database even though the work is present in the database. There are several reasons why a work's feature vector may fail to match a feature vector database entry. First, the recognition system may not be capable of 100% accuracy. Second, the extracted vector will often contain noise as a result of the transmission process. This noise may alter the values of a feature vector to the extent that a match is no longer possible.

Finally, there is the case where the observed work is not present in the database. In this case, the work can be sent to an operator for identification and insertion in the database.

§ 4.2.1.1.4 Exemplary Work Based Actions

Assuming that the work is correctly identified, then the identifier can be used to retrieve associated information from the second work identification-action translation (WIDAT) database 130 that contains information 136 associated with the particular work 134. This information may simply be a corresponding URL address, in which case the action can be considered to be a form of network address translation. However, in general, any information about the work could be stored therein, together with possible actions to be taken such as initiating an e-commerce transaction. After looking up the work identifier 134 in the WIDAT database 130, an action is performed on behalf of the user, examples of which has been previously described.

In addition to using the system to allow audience members of a work to connect to associated sites on the Internet, a number of other uses are possible. First, the work identification database 130 allows competitive market research data to be collected (e.g., the action may include logging an event). For example, it is possible to determine how many commercials the Coca Cola Company in the Chicago market aired in the month of June. This information is valuable to competitors such as Pepsi. Thus, any company that developed a system as described above could also expect to generate revenue from competitive market research data that it gathers.

Advertisers often wish to ensure that they receive the advertising time that was purchased. To do so, they often hire commercial verification services to verify that the advertisement or commercial did indeed run at the expected time. To do so, currently deployed systems by Nielsen and CMR embedded active signals in the advertisement prior to the broadcast. These signals are then detected by remote monitoring facilities that then report back to a central system which commercials were positively identified. See for example U.S. Pat. No. 5,629,739 by R. A. Dougherty entitled "Apparatus and method for injecting an ancillary signal into a low energy density portion of a color television frequency spectrum", U.S. Pat. No. 4,025,851 by D. E. Haselwood and C. M. Solar entitled "Automatic monitor for programs broadcast", U.S. Pat. No. 5,243,423 by J. P. DeJean, D. Lu and R. Weissman, entitled "Spread spectrum digital data transmission over TV video", and U.S. Pat. No. 5,450,122 by L. D. Keene entitled "In-station television program encoding and monitoring system and method". (Each of these patents is incorporated herein by reference.) Active systems are usually preferred for advertisement verification because the required recognition accuracy is difficult to achieve with passive systems. The passive monitoring system described herein supports commercial verification.

§ 4.2.1.2 Exemplary Architectures

Three alternative architectural embodiments in which the first technique may be employed are now described with reference to FIGS. 2, 3, and 4.

Figure 2:
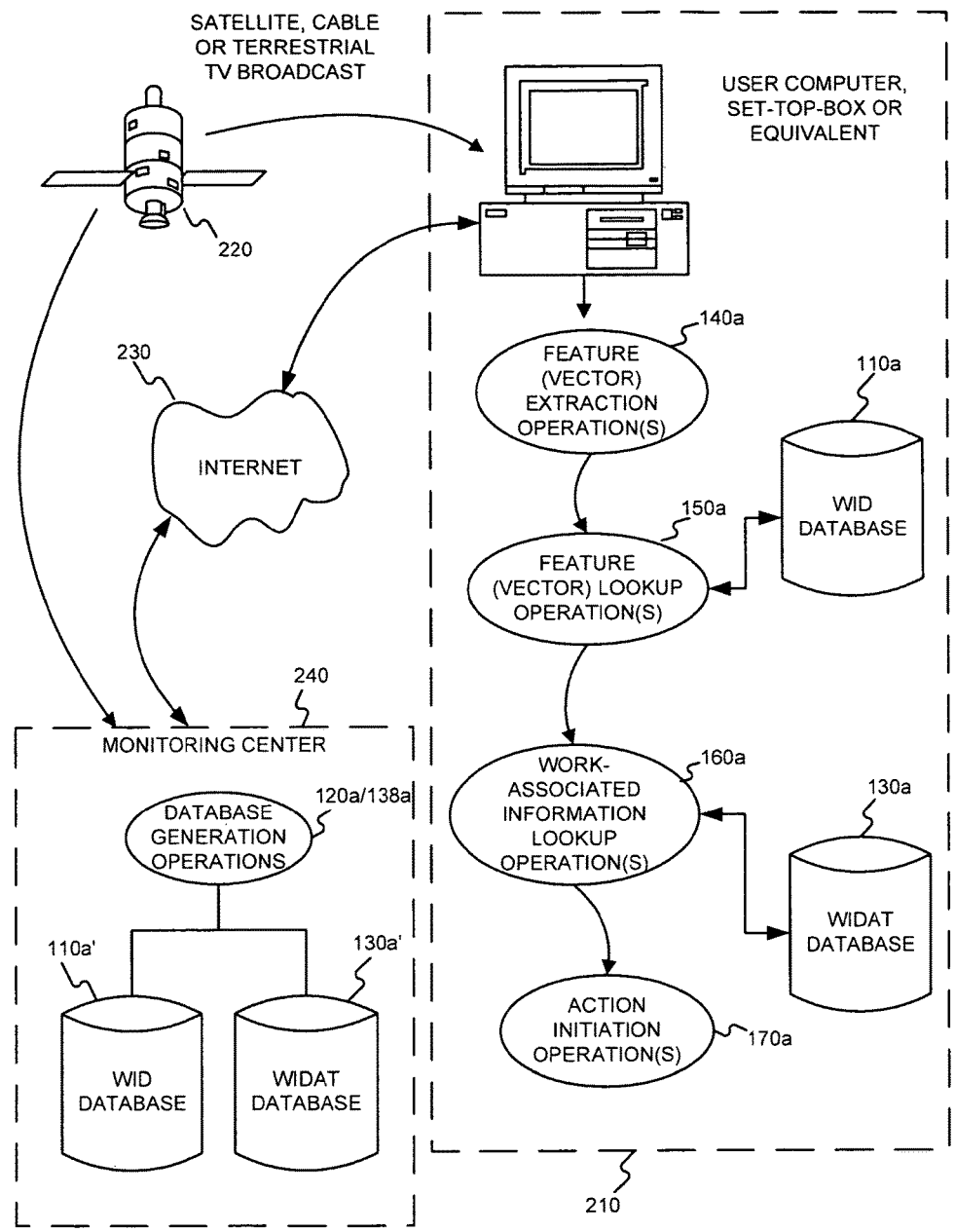
FIG. 2 is a block diagram illustrating a first embodiment of the present invention, in which intra-work information is used to identify the work.

FIG. 2 is a block diagram illustrating a first embodiment of the present invention, in which intra-work information is used to identify the work and in which a audience member device 210, such as a PC for example, receives and renders a work that is consumed by an audience member (user). At some point, the user may wish to perform a work-specific action such as traversing to an associated Web site. Upon initiation of this request, the computer 210 performs the operations 140*a*, 150*a*, 160*a* and 170*a*, such as those shown in FIG. 1. To reiterate, these operations include a feature extraction operation(s) 140*a*, feature vector lookup or matching operation(s) 150*a* in connection with items or records 112*a* in a work-identification (WID) database 110*a*. If a matching feature vector 114*a* is found, the work-associated information lookup operation(s) 160*a* can use the associated work identifier 116*a* to accessing a work identification-action translation (WIDAT) database 130*a* to retrieve associated information 136*a*, possibly including determining what action should be performed.

As described above, the two databases might be integrated into a single database. However, conceptually, they are described here as separate.

An example illustrating operations that can occur in the first embodiment of FIG. 1, is now described. Consider a print application, in which say 10,000 advertisements are to be recognized that appear in national newspapers and magazines. If 1 Kbyte is required to store each feature vector then approximately 10 Mbytes of storage will be required for the work identification database 110a. Such a size does not represent a serious problem, in either memory or disk space, to present personal computers.

An important issue then becomes recognition rate. While this may be problematic, all the images are two-dimensional—three-dimensional object recognition is not required. Of course, since a low cost camera captures the printed advertisement, there may be a number of geometric distortions that might be introduced together with noise. Nevertheless, the application is sufficiently constrained that adequate recognition rates should be achievable with current state-of-the-art computer vision algorithms. See, e.g., P. N. Yianilos "Excluded Middle Vantage Point Forests for nearest Neighbor Search", Presented at the Sixth DIMACS Implementation Challenge: Near Neighbor Searches workshop, Jan. 15, 1999. See also, P. N. Yianilos "Locally lifting the curse of Dimensionality for nearest Neighbor Search" SODA 2000: 361-370. (Each of these references is incorporated herein by reference.) Thus, for example, a sub-linear search time can be achieved. Unlike the kd-tree method which finds the nearest neighbor with certainty, randomized constructions, like the one described in P. N. Yianilos, "Locally lifting the curse of Dimensionality for nearest Neighbor Search" SODA 2000: 361-370, that succeed with some specified probability may be used. One example of a sub-linear time search is an approximate nearest neighbor search. Estimates of the size of the WIDAT database 130a depend on what associated information (recall fields 136) is stored. If, for example, only a URL address is needed, about 20 characters can typically represent most URLs. Thus, the size of the WIDAT database 130a would be less than 1 Mbyte.

The configuration just described with reference to FIG. 2 places all of the processing and data on each user's local machine 210. A number of alternative embodiments, in which some or all of the storage and processing requirements are performed remotely, will be described shortly.

As new works are created and made publicly available, the databases residing on a user's local computer become obsolete. Just as the database provider 240 must continually update the databases in order to remain current, there is also a need to update local databases on devices at audience member premises. This update process can be performed over the Internet 230 in a manner very similar to how software is currently upgraded. It is not necessary to download an entirely new database although this is an option. Rather, only the changes need to be transmitted. During this update process, the user's computer 210 might also transmit information to a central monitoring center 240 informing it of which advertisements the computer user has queried. This type of information is valuable to both advertisers and publishers. Of course, care must be taken to ensure the privacy of individual users of the system. However, it is not necessary to know the identity of individual users for the system to work.

Figure 3:
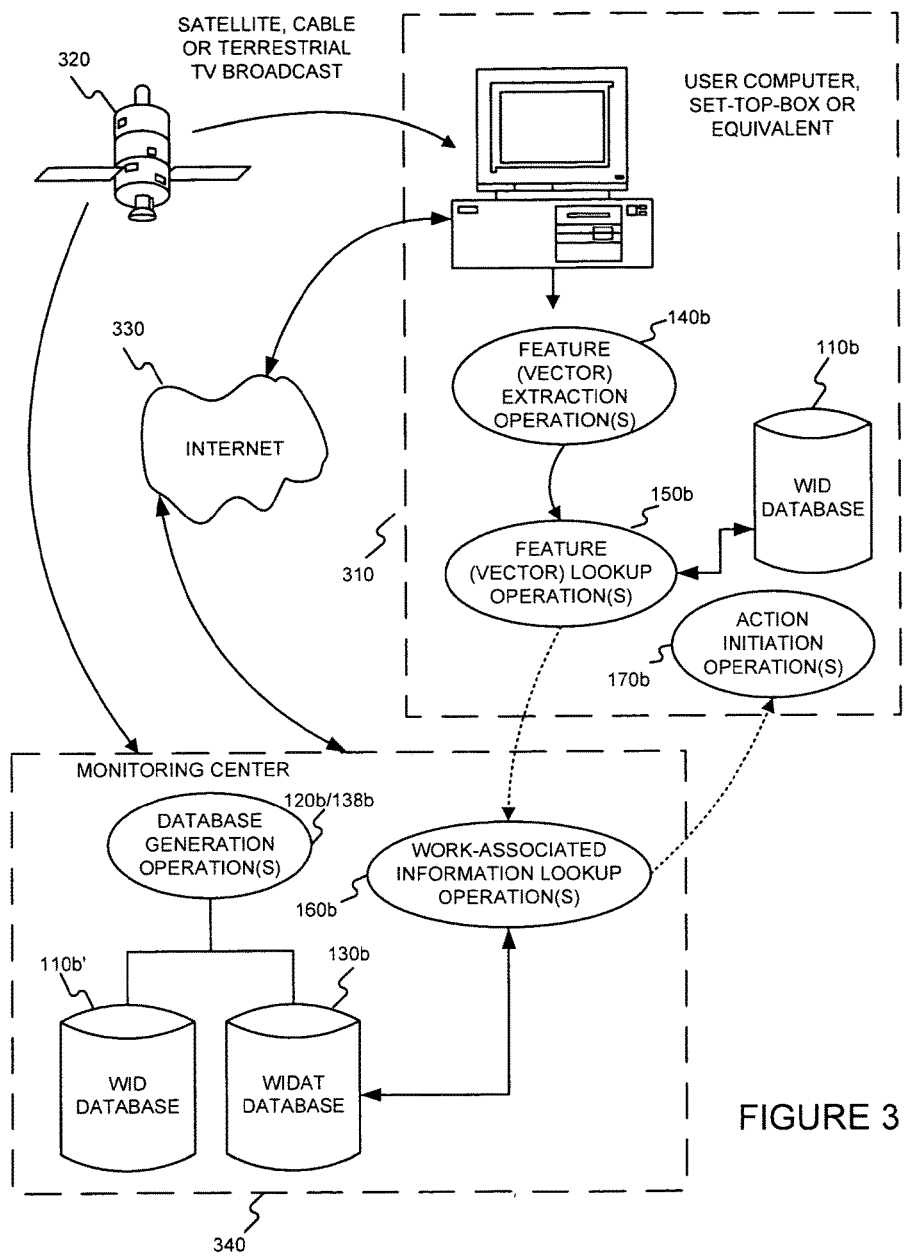
FIG. 3 is a block diagram illustrating a second embodiment of the present invention, in which intra-work information is used to identify the work.

FIG. 3 is a block diagram illustrating a second embodiment of the present invention, in which intra-work information is used to identify the work. Although the WIDAT database can be quite small, as illustrated in the exemplary embodiment described above with respect to FIG. 2, there is still the problem of keeping this database current. While periodic updates of the local databases may be acceptable, they become unnecessary if the WIDAT database 130b is at a remote location 340. In this arrangement, illustrated in FIG. 3, after the local computer 310 identifies the work, it sends a query to the remote WIDAT database 130b. The query may contain the work identifier. The remote site 340 may then return the associated information 136. Although the remote WIDAT database 130b needs to be updated by the database provider, this can be done very frequently without the need for communicating the updates to the local computers 310.

The second embodiment is most similar to active systems in which an embedded signal is extracted and decoded and the identifier is used to interrogate a central database. Consequently it has many of the advantages of such systems, while avoiding the need to insert signals into all works. One such advantage, is that the database provider receives real-time information relating to users' access patterns.

The WIDAT database 130b might physically reside at more than one location. In such a case, some requests will go to one site, and other requests will go to another. In this way, overloading of a single site by too many users can be avoided. Other load balancing techniques are also applicable.

Figure 4:
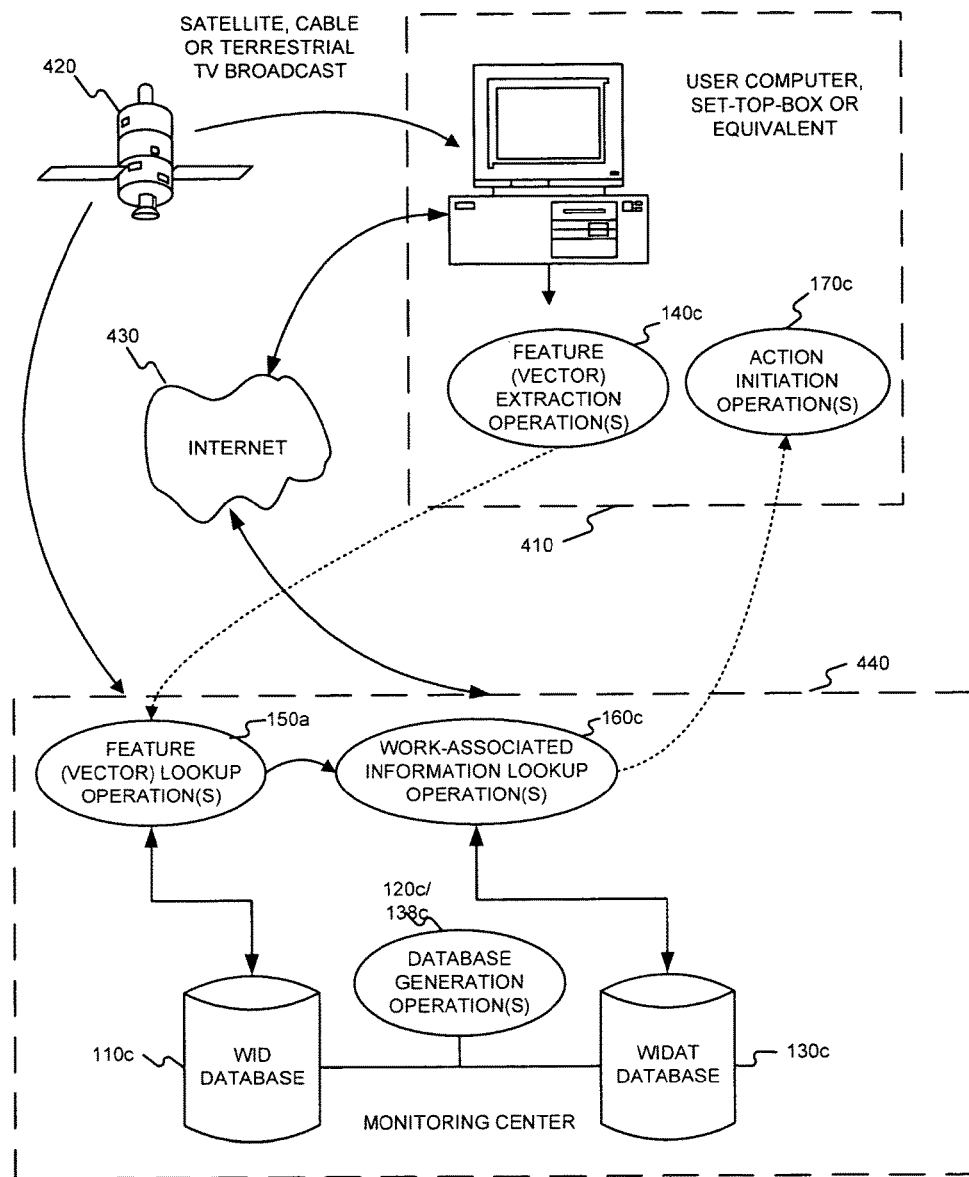
FIG. 4 is a block diagram illustrating a third embodiment of the present invention, in which intra-work information is used to identify the work.

FIG. 4 is a block diagram illustrating a third embodiment of the present invention, in which intra-work information is used to identify the work. Recall that the WIDAT database may be small relative to that work identification database (WID). As the size of the work recognition (WID) database increases, the foregoing embodiments may become impractical. Consider, for example, a music application in which it is desired to identify 100,000 song titles. If it is again assumed that a 1 Kbyte vector can uniquely represent each song, then on the order of 100 Mbytes is now needed. This size is comparable to large application programs such as Microsoft's Office 2000 suite. Although this still does not represent an inordinate amount of disk space, if this data needs to reside in memory at all times, then very few present machines will have adequate resources. Clearly, at some point, the proposed architectures scales to a point where requirements become impractical. In this case, a further modification to the architecture is possible.

Since the storage and searching of the work-identifier (WID) database require the most computation and storage, it may be more economical to perform these actions remotely. Thus, for example, if a user is playing an MP3 music file and wants to go to a corresponding website, the MP3 file is passed to an operation that determines one or more feature vectors. In the third embodiment, instead of performing the matching locally 410, the one or more vectors are transmitted to a central site 440 at which is stored the WID and WIDAT databases 110c and 130c together with sufficiently powerful computers to resolve this request and those of other computer users. This configuration is illustrated in FIG. 4. Similarly, if a user is playing an MPEG or other video file and wants to initiate a work-related action, the video file is passed to an operation 140c that extracts one or more feature vectors. The entire video file need not be processed. Rather, it may be sufficient to process only those frames in the temporal vicinity to the users request, i.e., to process the current frame and or some number of frames before and after the current frame, e.g. perhaps 100 frames in all. The extracted feature vector or feature vectors can then be transmitted to a central site 440 which can resolve the request.

After successfully matching the feature vector, the central site 440 can provide the user with information directly, or can direct the user to another Web site that contains the information the user wants. In cases where the recognition is ambiguous, the central site 440 might return information identifying one of several possible matches and allow the user to select the intended one.

The third embodiment is particularly attractive if the cost of extracting the feature vector is small. In this case, it becomes economical to have feature vector extraction 140*c* in digital set-top-boxes and in video recorders 410. The latter may be especially useful for the new generation of consumer digital video recorders such as those manufactured by TIVO and Replay TV. These devices already have access to the Internet via a phone line. Thus, when someone watching a recorded movie from television reacts to an advertisement, the video recorder would extract one or more feature vectors and transmit them to a central site 440. This site 440 would determine if a match existed between the query vector and the database of pre-stored vectors 110*c*. If a match is found, the central server 440 would transmit the associated information, which might include a Web site address or an 800 number for more traditional ordering, back to the audience user device 410. Of course, a consumer device 410 such as a digital video recorder might also store personal information of the owner to facilitate online e-commerce. Such a device 410 could store the owner's name, address, and credit card information and automatically transmit them to an on-line store to complete a purchase. Very little user interaction other than to authorize the purchase might be needed. This type of purchasing may be very convenient to consumers.

Another advantage of the third embodiment is that it obviates the need to update local databases while, at the same time, the centrally maintained databases can be kept current with very frequent updating.

§ 4.2.2 Embodiments in which Work is Recognized Based on Extra-Work Information

Operations related to this embodiment are described in § 4.2.2.1 below. Then, various architectures which may be used to effect such operations are described in § 4.2.2.2.

If the cost of extracting a feature vector is too large, then the cost of deploying any of the embodiments described in § 4.2.1 above may be prohibitive. This is particularly likely in very cost sensitive consumer products, including set-top-boxes and next generation digital VCR's. Acknowledging this fact, a different technique, one that is particularly well suited for broadcasted media such as television and radio as well as to content published in magazines and newspapers, is now described. This technique relies on the fact that a work need not be identified by a feature vector extracted from the work (which is an example of "intra-work information"), but can also be identified by when and where it is published or broadcast (which are examples of "extra-work information")

An example serves to illustrate this point. Consider the scenario in which a viewer sees a television commercial and responds to it. The embodiments described in § 4.2.1 above required the user device (e.g., a computer or set-top-box) 210/310/410 to extract a feature vector. Such an extracted vector was attempted to be matched to another feature vector(s), either locally, or at a remote site. In the embodiments using a remote site, if the central site is monitoring all television broadcasts, then the user's query does not need to include the feature vector. Instead, the query simply needs to identify the time, geographic location and the station that the viewer is watching. A central site can then determine which advertisement was airing at that moment and, once again, return the associated information. The same is true for radio broadcasts. Moreover, magazines and newspapers can also be handled in this manner. Here the query might include the name of the magazine, the month of publication and the page number.

Figure 5:
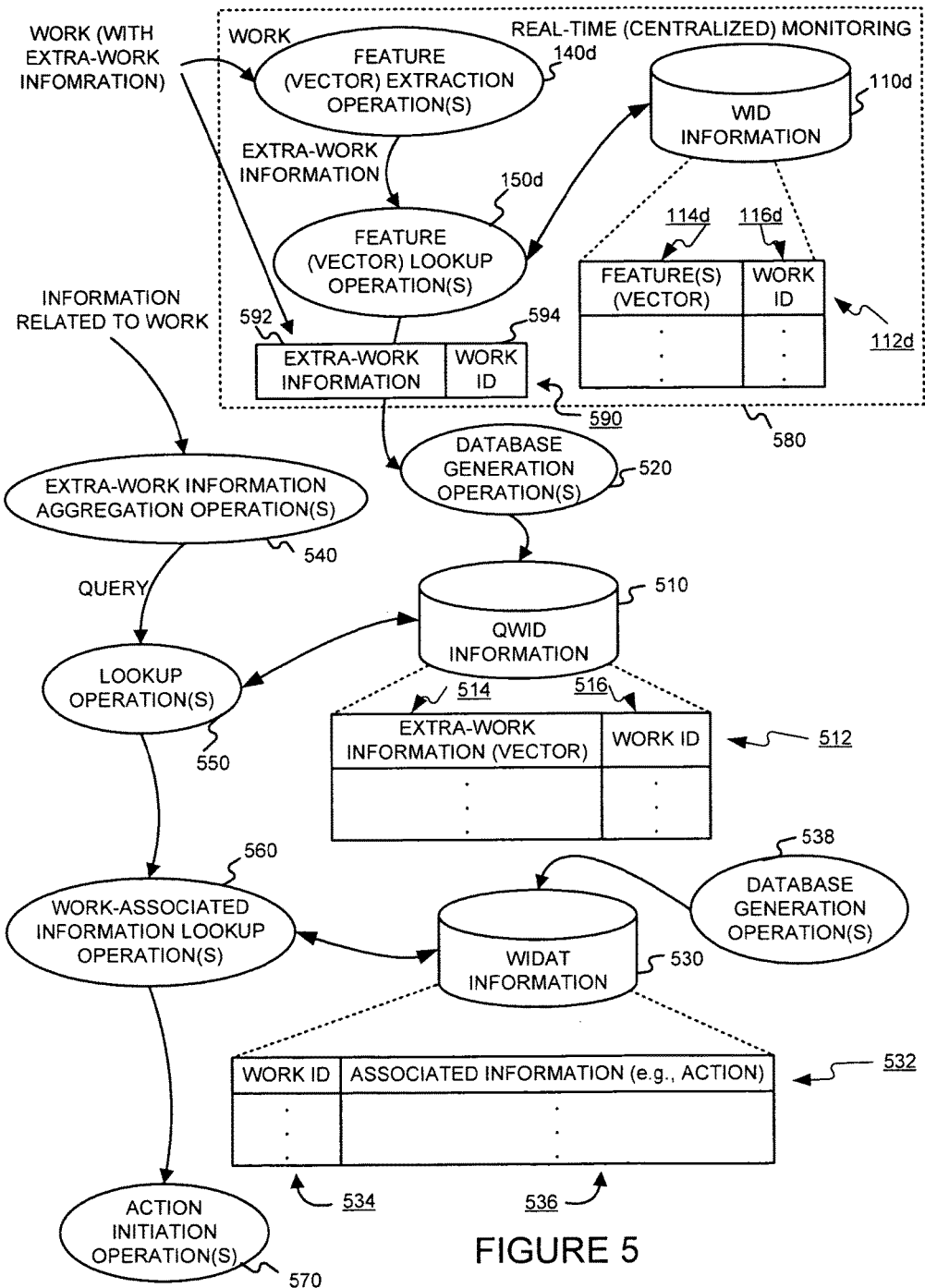
FIG. 5 is a process bubble diagram of operations that may be performed in accordance with another version of the present invention, in which extra-work information is used to identify the work.

§ 4.2.2.1 Operations and Exemplary Methods and Techniques for Effecting Such Operations FIG. 5 is a process bubble diagram of operations that may be performed in accordance with another version of the present invention, in which extra-work information is used to identify the work. As shown, a query work-identification (QWID) information storage 510 may include a number of items or records 512. Each item or record 512 may associate extra-work information 514, related to the work, with a, preferably unique, work identifier 516. The query work-identification (QWID) information storage 510 may be generated by a database generation operation(s) 520.

Further, work identifier-action information (WIDAT) storage 530 may include a number of items or records 532. Each item or record 532 may associate a, preferably unique, work identifier 534 with associated information 536, such as an action for example. The work identifier-action (WIDAT) information storage 530 may be generated by a database generation operation(s) 538 which may, for example, accept manual entries.

As can be appreciated from the foregoing, the query work-information (QWID) storage 510 records 512 and the work identification-action (WIDAT) storage 530 records 532 can be combined into a single record.

The extra-work information aggregation (e.g., query generation) operation(s) 540 can accept a information related to a work, such as the time of a user request or of a rendering of the work, the geographic location at which the work is rendered, and the station that the audience member has selected, and generate a query from such extra-work information.

The query including the extra-work information can be used by a lookup operation(s) 550 to search for a "matching" set of information 514. If a match, or a match within a predetermined threshold is determined, then the associated work identifier 516 is read.

The read work identifier can then be used by a work-associated information lookup operation(s) 560 to retrieve associated information, such as an action, 536 associated with the work identifier. Such information 536 can then be passed to action initiation operation(s) 570 which can perform some action based on the associated information 536.

If the extra-work information of a work is known (in advance), generating the query work identifier (QWID) information 510 is straight-forward. If this were always the case, an intra-work information-based recognition operation would not be needed. However, very often this is not the case. For example, local television broadcasts typically have discretion to insert local advertising, as well as national advertising. Thus, it often is not possible to know in advance when, on what station, and where a particular advertisement will play.

In such instances, a real-time (e.g., centralized) monitoring facility 580 may be used to (i) extract feature vectors from a work, (ii) determine a work identifier 116 from the extracted features, and (iii) communicate one or more messages 590 in which extra-work information (e.g., time, channel, geographic market) 592 is associated with a work identifier 594, to operation(s) 520 for generating query work identification (QWID) information 510.

§ 4.2.2.1.1 Exemplary Extra-Work INFORMATION

In the context of national broadcasts, geographic information may be needed to distinguish between, for example, the ABC television broadcast in Los Angeles and that in New York. While both locations broadcast ABC's programming, this programming airs at different times on the East and West coasts of America. More importantly, the local network affiliates that air ABC's shows have discretion to sell local advertising as well as a responsibility to broadcast the national commercials that ABC sells. In short, the works broadcast by ABC in Los Angeles can be different from that in other geographic locations. Geographic information is therefore useful to distinguish between the different television markets. In some circumstances, geographic information may not be necessary, especially in parts of the world with highly regulated and centralized broadcasting in which there are not regional differences.

§ 4.2.2.1.2 Exemplary Techniques for Generating Databases

FIG. 5 illustrates a third database 510 referred to as the query to work identification (QWID) database. This database 510 maps the query (e.g., in the form of time, location and channel information) into a unique ID that identifies the perceived work. The QWID 510 and WIDAT 530 databases might not be separate, but for clarity will be considered so. After retrieving the unique work identifier 512 from the QWID database 510, the identifier can be used to access the WIDAT database 530. This is discussed in more detail later.

As introduced above, although it appears that this architecture does not require a recognition facility, such a facility may be needed. The feature extraction operation(s) 140*d*, as well as the work identification operation(s) 150*d* and other databases 110*d*, may be moved to one or more remote sites 580.

Although TV Guide and other companies provide detailed information regarding what will be broadcast when, these scheduling guides do not have any information regarding what advertisements will air when. In many cases, this information is unknown until a day or so before the broadcast. Even then, the time slots that a broadcaster sells to an advertiser only provide a time range, e.g. 12 pm to 3 pm. Thus it is unlikely that all commercials and aired programming can be determined from TV schedules and other sources prior to transmission. Further, occasionally programming schedules are altered unexpectedly due to live broadcasts that overrun their time slots. This is common in sports events and awards shows. Another example of interrupts to scheduled programming occurs when a particularly important news event occurs.

During transmission, it may therefore be necessary for a central site 580 to determine what work is being broadcast and to update its and/or other's database 520 accordingly based on the work identified 594 and relevant extra-work information 592. There are a variety of ways that this can be accomplished.

First, it may be economically feasible to manually monitor all television stations that are of interest, and manually update the database with information regarding the work being monitored. In fact, Nielsen used such procedures in the early 1960's for the company to tabulate competitive market data. More than one person can be employed to watch the same channel in order to reduce the error rate. It should be noted that the recent ruling by the FCC that satellite broadcasters such as DirecTV, DishTV and EchoStar can carry local stations significantly reduces the cost of monitoring many geographic markets. Currently, DirecTV, for example, carries the four main local stations in each of the 35 largest markets. Thus, these 4.times.35=140 channels can all be monitored from a single site 580. This site would be provided with satellite receivers to obtain the television channels.

Unfortunately, however, humans are error prone and the monitoring of many different stations from many different geographic locations can be expensive. In order to automate the recognition process, a central site 580 could employ a computer-based system to perform automatic recognition. Because the recognition is centralized, only one or a few sites are needed. This is in comparison with the first architecture we described in which a complete recognition system was required in every user's home or premise. This centralization makes it more economic to employ more expensive computers, perhaps even special purpose hardware, and more sophisticated software algorithms. When video frames or clips cannot be identified or are considered ambiguous, this video can be quickly passed to human viewers to identify. Further, it should be possible for the automated recognition system to use additional information such as television schedules, time of day, etc in order to improve its recognition rate.

§ 4.2.2.1.2 Exemplary Techniques for Generating Queries Based on Extra-Work Information At the audience member (user) premises, all that is needed is for the device to send a query to a database-server with information that includes extra-work information, such as geographic location, time and channel. Usually, this extra-work information would be transmitted in real-time, while the work (e.g., an advertisement) is being broadcast. However, this is not necessary. If the television does not have access to the Internet, and most TV's do not yet, then an audience member (user) may simply remember or record which channel he or she was viewing at what time. In fact, the user device could store this information for later retrieval by the user. At a convenient later time, the user might access the Internet using a home PC. At this time, he or she can query the database by entering this extra-work information (e.g., together with geographic information) into an application program or a web browser plug-in.

Another possibility is allowing an audience member (user), at the time he or she is consuming (e.g., viewing, reading, listening to, etc.) the work, to enter query information into a handheld personal digital assistant ("PDA") such as a Palm Pilot, so as not to forget it. This information can then be manually transferred to a device connected to a network, or the information can be transferred automatically using, for example, infrared communications or via a physical link such as a cradle. Recently, PDAs also have some wireless networking capabilities built in, and thus might support direct access to the information desired. Further, software is available that allows a Palm Pilot or other PDA to function as a TV remote control device. As such, the PDA already knows the time of day and channel being viewed. It also probably knows the location of the audience member, since most PDA users include their own name and address in the PDA's phonebook and identify it as their own. Thus, with one or a few clicks, an audience member PDA user could bookmark the television content he or she is viewing. If the PDA is networked, then the PDA can, itself, retrieve the associated information immediately. Otherwise, the PDA can transfer this bookmarked data to a networked device, which can then provide access to the central database.

§ 4.2.2.2 Exemplary Architectures

Figure 6:
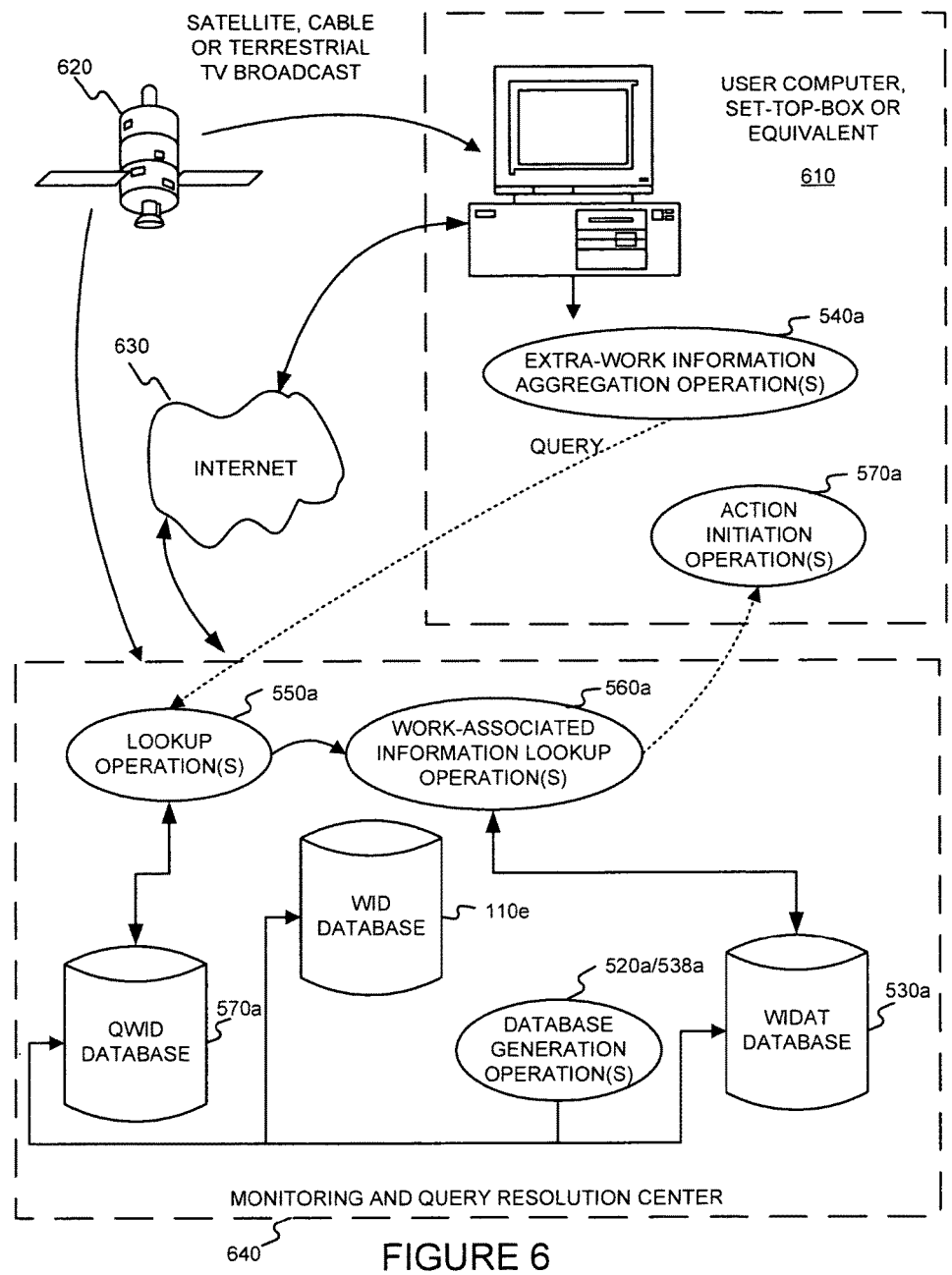
FIG. 6 is a block diagram illustrating a fourth embodiment of the present invention, in which extra-work information is used to identify the work.

FIG. 6 is a block diagram illustrating a fourth embodiment of the present invention, in which extra-work information is used to identify the work. As shown, an extra-work information aggregation operation 540a may be effected on a device 610, such as a PC, at the audience member (user) premises. The various databases 510a, 530a, and 110e, as well as the database generation operation(s) 520a/538a, the lookup operation(s) 550a and the work-associated information lookup operation(s) 560a may be provided at one or more centralized monitoring and query resolution centers 640.

Figure 7:
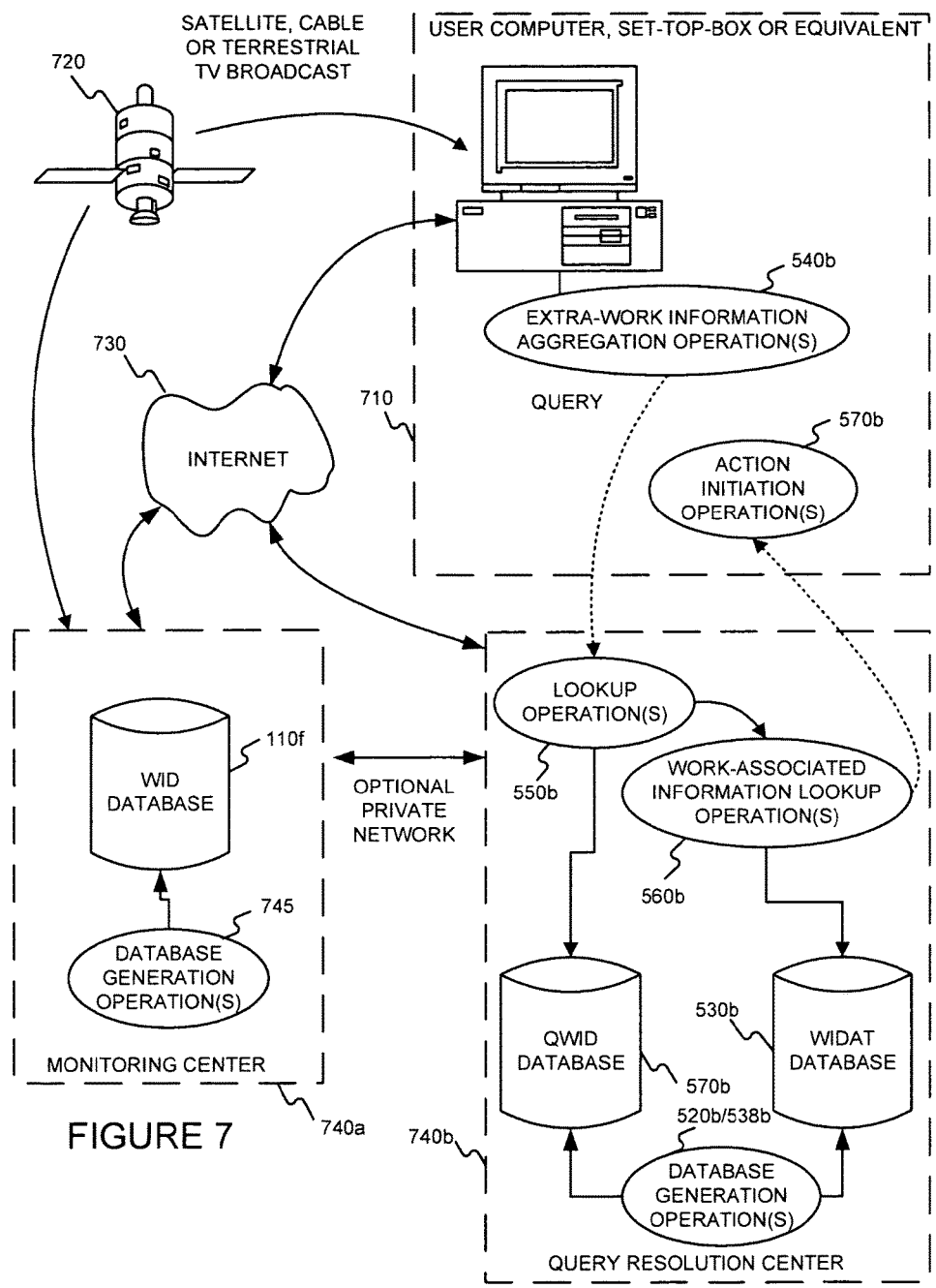
FIG. 7 is a block diagram illustrating a fifth embodiment of the present invention, in which extra-work information is used to identify the work.

FIG. 7 is a block diagram illustrating a fifth embodiment of the present invention, in which extra-work information is used to identify the work. This fifth embodiment is similar to the fourth embodiment illustrated in FIG. 6 but here, the monitoring center 740a and query resolution center 740b are separate.

These embodiments have many advantages for television and radio broadcasters who desire to provide Internet links or other action. First, the audience member (user) equipment, whether it is a computer, set-top-box, television, radio, remote control, personal digital assistant (pda), cell phone or other device, does not need to perform any processing of the received signal. As such, there is almost no cost involved to equipment manufacturers.

These last embodiments have some similarity with services such as those provided by the companies Real Names of Redwood City, Calif., America Online ("AOL") and especially iTag from Xenote. The popular press has reported on the difficulties associated with assigning domain names. The simplest of these problems is that almost all the one-word names in the ".com" category have been used. Consequently, domain names can often be difficult to remember. To alleviate this problem, RealNames and AOL provide alternative, proprietary name spaces (AOL calls these keywords). For a fee, a company may register a name with these companies. Thus, rather than type the URL http://www.bell-labs.com, the simple keyword "bell" might be sufficient to access the same Web site. These capabilities are convenient to users. However, these systems are very different from the fourth and fifth embodiments described. First, and foremost, these systems are not designed to identify content. Rather, they are simply alternative network address translation systems based on easily remembered mnemonics which are sold to interested companies. As such, the user is still expected to type in an address, but this address is easier to remember than the equivalent URL. In contrast, while a user may manually enter the information describing the work, the preferred embodiment is for the computer, set-top-box or other device to automatically generate this information. Further, the mapping of keywords to network addresses is an arbitrary mapping maintained by AOL or Real Names. For example, the keyword "bell" might just as reasonably point to the Web site for Philadelphia's Liberty Bell as to Lucent's Bell Labs. In contrast, the query used in the fourth and fifth embodiments is designed to contain all the necessary data to identify the work, e.g. the time, place and television channel during which the work was broadcast. There is nothing arbitrary about this mapping. It should also be pointed out that the proposed system is dynamic—the same work, e.g. a commercial, potentially has an infinite number of addresses depending on when and where it is broadcast. If an advertisement airs 100,000 unique times, then there are 100,000 different queries that uniquely identify it. Moreover, the exemplary query includes naturally occurring information such as time, place, channel or page number. This is not the case for AOL or RealNames, which typically assigns one or more static keywords to the address of a Web site.

Xenote's iTag system is designed to identify radio broadcasts and uses a query similar to that which may be used in the fourth and fifth embodiments, i.e. time and station information. However, the work identification information is not dynamically constructed but is instead based on detailed program scheduling that radio stations must provide it. As such, it suffers from potential errors in scheduling and requires the detailed cooperation of broadcasters. While the fourth and fifth embodiments might choose to use program scheduling information and other ancillary information to aid in the recognition process, they do not exclusively rely on this. The concept of resolving a site name by recognizing the content is absent from the above systems.

§ 4.2.3 Exemplary Apparatus for Audience Member (User) Premise Device

While personal computers may be the primary computational device at a user's location, it is not essential to use a PC. This is especially true of the embodiments depicted in FIGS. 6 and 7, which do not require the content, e.g. video signal, to be processed. Instead, only a unique set of identification parameters such as time, location and channel are provided to identify the perceived Work. Many forms of devices can therefore take advantage of this configuration.

As previously noted, personal digital assistants (PDAs) can be used to record the identification information. This information can then be transferred to a device with a network communication such as a PC. However, increasingly, PDAs will already have wireless network communication capabilities built-in, as with the Palm VII PDA. These devices will allow immediate communication with the query resolution center and all information will be downloaded to them or they can participate in facilitating an e-commerce transaction. Similarly, wireless telephones are increasingly offering web-enabled capabilities. Consequently, wireless phones could be programmed to act as a user interface.

New devices can also be envisaged, including a universal remote control for home entertainment systems with a LCD or other graphical display and a network connection. This connection may be wireless or the remote control might have a phone jack that allows it to be plugged directly into an existing phone line. As home networks begin to be deployed, such devices can be expected to communicate via an inexpensive interface to the home network and from there to access the Internet.

In many homes, it is not uncommon for a computer and television to be used simultaneously, perhaps in the same room. A person watching television could install a web browser plug-in or applet that would ask the user to identify his location and the station being watched. Then, periodically, every 20 seconds for example, the plug-in would update a list of web addresses that are relevant to the television programs being watched, including the commercials. The audience member would then simply click on the web address of interest to obtain further information. This has the advantage that the viewer does not have to guess the relevant address associated with a commercial and, in fact, can be directed to a more specialized address, such as www.fordvehicles.com/ibv/tausrus2kflash/flash.html, rather than the generic www.ford.com site. Of course, this applet or plug-in could also provide the database entity with information regarding what is being accessed from where and at what time. This information, as noted earlier, is valuable to advertisers and broadcasters. For PC's that have infra-red communication capabilities, it is straightforward to either control the home entertainment center from the PC or for the PC to decode the signals from a conventional remote control. Thus, as a user changes channels, the PC is able to automatically track the channel changes.

Recording devices such as analog VCR's and newer digital recording devices can also be exploited in the embodiments depicted in FIGS. 6 and 7, especially if device also record the channel and time information for the recorded content. When a user initiates a query, the recorded time and channel, rather than the current time and channel, then form part of the identification information.

Digital set-top-boxes are also expected to exploit the capabilities described herein. In particular, such devices will have two-way communication capabilities and may even include cable modem capabilities of course, the two-way communication need not be over a television cable. For example, satellite set-top-boxes provide up-link communications via a telephone connection. Clearly, such devices provide a convenient location to enable the services described herein. Moreover, such services can be provided as part of the OpenCable and DOCSIS (data over cable service interface specification) initiatives.

§ 4.2.4 Information Retrieval Using Features Extracted from Audio and/or Video Works Some embodiments consistent with the present invention provide a computer-implemented method, apparatus, or computer-executable program for providing information about an audio file or (a video file) played on a device. Such embodiments might (a) extract features from the audio (or video) file, (b) communicate the features to a database, and (c) receive the information about the audio (or video) file from the database. In some embodiments consistent with the present invention, the act of extracting the features is performed by a microprocessor of the device, and/or a digital signal processor of the device. The received information might be rendered on an output (e.g., a monitor, a speaker, etc.) of the device. The received information might be stored (e.g., persistently) locally on the device. The information might be stored on a disk, or non-volatile memory.

In some of the embodiments pertaining to audio files, the audio file might be an mp3 file or some other digital representation of an audio signal. The information might include a song title, an album title, and/or a performer name.

In some of the embodiments pertaining to video files, the video file might be an MPEG file or some other digital representation of a video signal. The video file might be a video work, and the information might include a title of the video work, a director of the video work, and names of performers in the video work.

§ 4.3 Operational Examples

An example illustrating operations of an exemplary embodiment of the present invention, that uses intra-work information to identify the work, is provided in § 4.3.1. Then, an example illustrating operations of an exemplary embodiment of the present invention, that uses extra-work information to identify the work, is provided in § 4.3.2.

§ 4.3.1 Operational Example where Intra-Work Information is Used to Identify the Work A generic system for monitoring television commercials is now described. Obviously, the basic ideas extend beyond this specific application.

The process of recognition usually begins by recognizing the start of a commercial. This can be accomplished by looking for black video frames before and after a commercial. If a number of black frames are detected and subsequently a similar number are detected 30 seconds later, then there is a good chance that a commercial has aired and that others will follow. It is also well known than the average sound volume during commercials is higher than that for television shows and this too can be used as an indicator of a commercial. Other methods can also be used. The need to recognize the beginning of a commercial is not essential. However, without this stage, all television programming must be assumed to be commercials. As such, all video frames must be analyzed. The advantage of determining the presence of a commercial is that less video content must be processed. Since the percentage of advertising time is relatively small, this can lead to considerable savings. For example, commercials can be buffered and then subsequently processed while the television show is being broadcast. This reduces the real-time requirements of a system at the expense of buffering, which requires memory or disk space. Of course, for the applications envisioned herein, a real-time response to a user requires real-time processing.

Once it is determined that an advertisement is being broadcast, it is necessary to analyze the video frames. Typically, a compact representation of each frame is extracted. This vector might be a pseudo-random sample of pixels from the frame or a low-resolution copy of the frame or the average intensities of n.times.n blocks of pixels. It might also be a frequency-based decomposition of the signal, such as produced by the Fourier, Fourier-Mellin, wavelet and or discrete cosine transforms. It might involve principal component analysis or any combination thereof. The recognition literature contains many different representations. For block-based methods, the n.times.n blocks may be located at pseudo-random locations in each frame or might have a specific structure, e.g. a complete tiling of the frame. The feature vector might then be composed of the pixels in each block or some property of each block, e.g. the average intensity or a Fourier or other decomposition of the block. The object of the vector extraction stage is to obtain a more concise representation of the frame. Each frame is initially composed of 480.times.720 pixels which is equivalent to 345,600 bytes, assuming one byte per pixel. In comparison, the feature vector might only consist of 1 Kbyte of data. For example, if each frame is completely tiled with 16.times.16 blocks, then the number of blocks per frame is 345,600/256=1350. If the average intensity of each block constitutes the feature vector, then the feature vector consists of 1350 bytes, assuming 8-bit precision for the average intensity values. Alternatively, 100 16.times.16 blocks can be pseudo-randomly located on each frame of the video. For each of these 100 blocks, the first 10 DCT coefficients can be determined. The feature vector then consists of the 100.times.10=1000 DCT coefficients. Many other variations are also possible. In many media applications, the content possesses strong temporal and spatial correlations. If necessary, these correlations can be eliminated or substantially reduced by pre-processing the content with a whitening filter.

A second purpose of the feature extraction process is to acquire a representation that is robust or invariant to possible noise or distortions that a signal might experience. For example, frames of a television broadcast may experience a small amount of jitter, i.e. horizontal and or vertical translation, or may undergo lossy compression such as MPEG-2. It is advantageous, though not essential, that these and other processes do not adversely affect the extracted vectors.

Each frame's feature vector is then compared with a database of known feature vectors. These known vectors have previously been entered into a content recognition database together with a unique identifier. If a frame's vector matches a known vector, then the commercial is recognized. Of course, there is the risk that the match is incorrect. This type of error is known as a false positive. The false positive rate can be reduced to any desired value, but at the expense of the false negative rate. A false negative occurs when a frame's vector is not matched to the database even though the advertisement is present in the database. There are several reasons why a frame's feature vector may fail to match. First, the recognition system may not be capable of 100% accuracy. Second, the extracted vector will contain noise as a result of the transmission process. This noise may alter the values of a feature vector to the extent that a match is no longer possible. Finally, there is the case where the observed commercial is not yet present in the database. In this case, it is necessary to store the commercial and pass it (e.g., to a person) for identification and subsequent entry in the database.

It is important to realize that the matching of extracted and known vectors is not equivalent to looking up a word in an electronic dictionary. Since the extracted vectors contain noise or distortions, binary search is often not possible. Instead, a statistical comparison is often made between an extracted vector and each stored vector. Common statistical measures include linear correlation and related measures such as correlation coefficient, but other methods can also be used, including clustering techniques. See, e.g., the Duda and Hart reference. These measures provide a statistical measure of the confidence of the match. A threshold can be established, usually based on the required false positive and negative rates, such that if the correlation output exceeds this threshold, then the extracted and known vectors are said to match.

If binary search was possible, then a database containing N vectors would require at most log(N) comparisons. However, in current advertisement monitoring applications there is no discussion of efficient search methods. Thus, a linear search of all N entries may be performed, perhaps halting the search when the first match is found. On average, this will require N/2 comparisons. If N is large, this can be computationally expensive. Consider a situation in which one out of 100,000 possible commercials is to be identified. Each 30-second commercial consists of 900 video frames. If all 900 frames are stored in the database, then N=90,000,000. Even if only every $10^{th}$ video frame is stored in the database, its size is still nine million. While databases of this size are now common, they rely of efficient search to access entries, i.e., they do not perform a linear search. A binary search of a 90,000,000-item database requires less than 20 comparisons. In contrast, a linear search will require an average of 45,000,000!

With 9 million entries, if each vector is 1 Kbyte, then the storage requirement is 9 Gigabytes. Disk drives with this capacity are extremely cheap at this time. However, if the database must reside in memory due to real-time requirements, then this still represents a substantial memory requirement by today's standards. One reason that the data may need to be stored in memory is because of the real-time requirements of the database. If 10 channels are being simultaneously monitored within each of 50 geographic areas, then there will be 15,000 queries per second to the content recognition database, assuming each and every frame is analyzed. This query rate is low. However, if a linear search is performed then 675 billion comparisons per second will be required. This is an extremely high computational rate by today's standards. Even if only key frames are analyzed, this is unlikely to reduce the computational rate by more than an order of magnitude.

If an advertisement is not recognized, then typically, the remote monitoring system will compress the video and transmit it back to a central office. Here, the clip is identified and added to the database and the remote recognition sites are subsequently updated. Identification and annotation may be performed manually. However, automatic annotation is also possible using optical character recognition software on each frame of video, speech recognition software, close captioning information and other information sources. As these methods improve in accuracy, it is expected that they will replace manual identification and annotation.

The recognition system described can be considered to be a form of nearest neighbor search in a high dimensional feature space. This problem has been very well studied and is known to be very difficult as the dimensionality of the vectors increases. A number of possible data structures are applicable including kd-trees and vantage point trees. These data structures and associated search algorithms organize a N-point dataset (N=90,000,000 in out previous example) so that sub-linear time searches can be performed on average. However, worst-case search times can be considerably longer. Recently, Yianilos proposed an excluded middle vantage point forest for nearest neighbor search. See, e.g., the Yianilos reference. This data structure guarantees sub-linear worst-case search times, but where the search is now for a nearest neighbor within a fixed radius, .tau.. The fixed radius search means that if the database contains a vector that is within .tau. of the query, then there is a match. Otherwise, no match is found. In contrast, traditional vantage point trees will always return a nearest neighbor, even if the distance between the neighbor and the query is very large. In these cases, if the distance between the query and the nearest neighbor exceeds a threshold, then they are considered not to match. This is precisely what the excluded middle vantage point forest implicitly does.

Using an excluded middle vantage point forest, will allow accurate real-time recognition of 100,000 broadcasted advertisements. This entails constructing an excluded middle vantage point forest based on feature vectors extracted from say 90,000,000 frames of video. Of course, using some form of pre-filtering that eliminates a large number of redundant frames or frames that are not considered to be good unique identifiers can reduce this number. One such pre-filter would be to only examine the I-frames used when applying MPEG compression. However, this is unlikely to reduce the work identification database (WID) size by more than one order of magnitude. Assuming 10 channels are monitored in each of 50 geographic regions, then the query rate is 15,000=10.times.50.times.30 queries per second.

Figure 8:
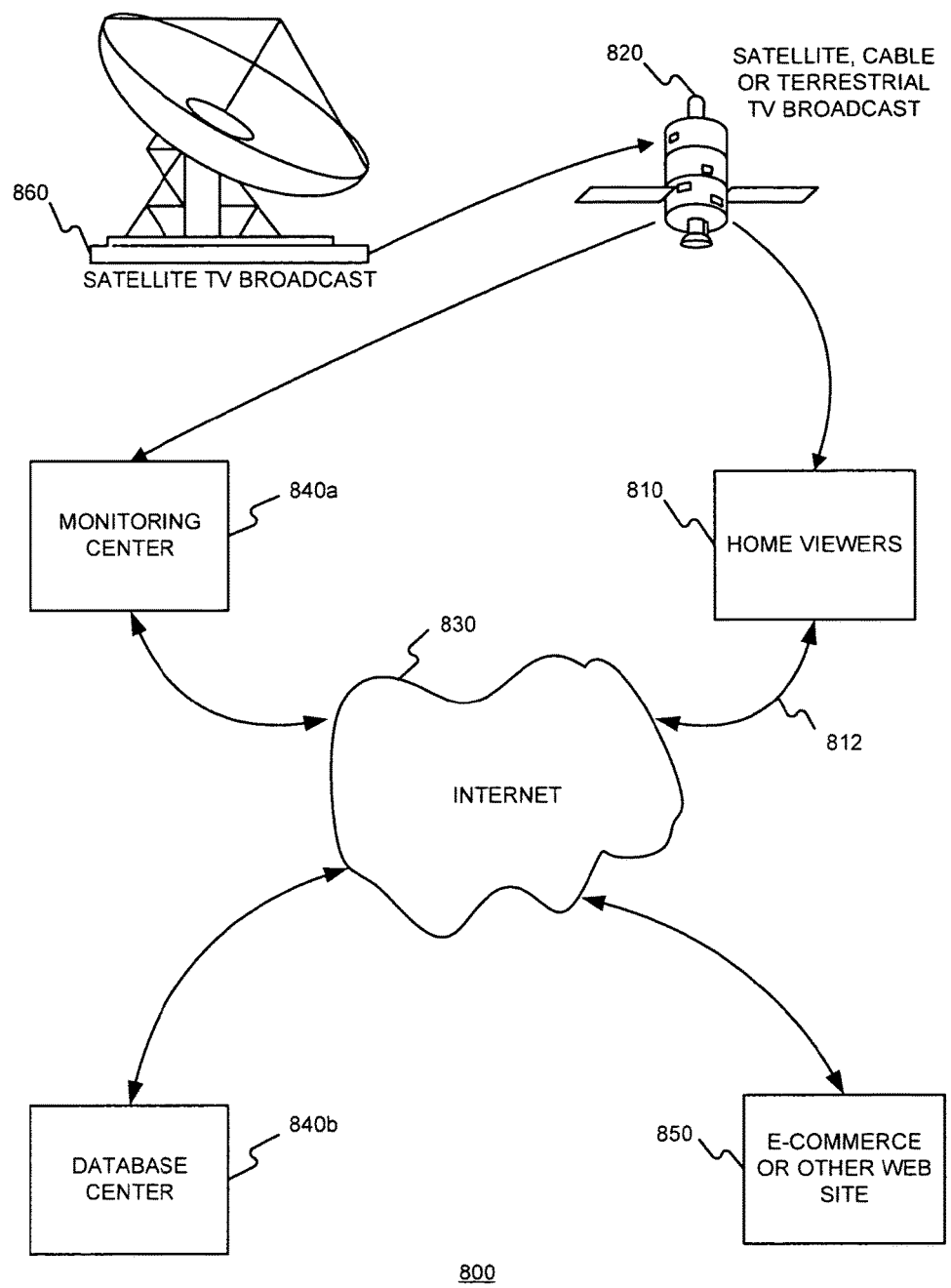
FIG. 8 is a block diagram illustrating an environment in which the present invention may operate.

§ 4.3.2 Operational Example where Extra-Work Information is Used to Identify the Work FIG. 8 depicts a satellite television broadcast system 800, though cable and traditional broadcast modes are also applicable. Block 810 represents audience members (users) watching a TV channel in their home, which also has a connection 812 to the Internet 820. Other networks are also possible. The satellite broadcasts are also being monitored by one or more television monitoring centers 840a. These centers 840a may monitor all or a subset of the television channels being broadcast. They are not restricted to monitoring satellite TV broadcasts but may also monitor cable and traditional terrestrial broadcasts. The primary purpose of these monitoring centers 840a is to identify the works being broadcasted. Of particular interest are television advertisements. However, other works, or portions thereof, may also be identified. Each time a new segment of a work is identified, the monitoring system or systems 840a update one or more database centers 840b, informing them of the time, place, channel and identity of the identified segment. The segment may be a complete thirty second commercial or, more likely, updates will occur more frequently, perhaps at a rate of 1 update per second per channel per geographic location. The database center 840b updates its database so that queries can be efficiently responded to in sub-linear time.

Figure 9:
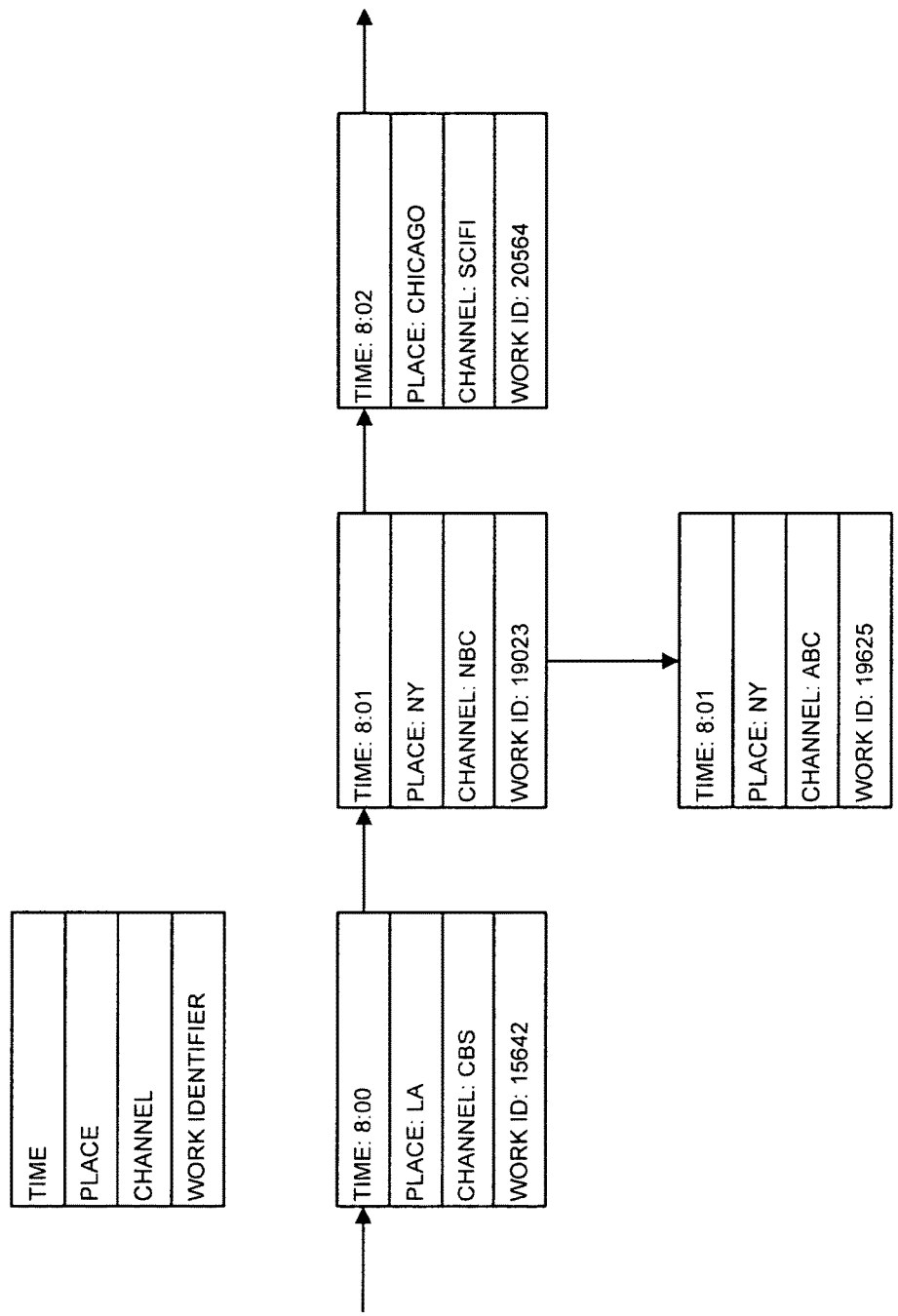
FIG. 9 is an exemplary data structure in which extra-work information is associated with a work identifier.

The database centers 840b can use traditional database technology. In general, the query search initiated by an audience member is not a nearest neighbor search but can be a classical textual search procedure such as a binary search. The nearest neighbor search is appropriate for the monitoring sub-system 840a. The database centers 840b are continually updated as each new advertisement, television show or portion thereof is recognized. Standard updating algorithms can be used. However, random new entries to the database are unlikely. Rather, each new entry, or set of entries, denotes a new time segment that is later than all previously inserted items. As such, each new entry can be appended to the end of the database while still maintaining an ordered data structure that is amenable to binary and other efficient search techniques. If two entries have the same time in their time field, items can be sorted based on secondary fields such as the channel and geographic location, as depicted in FIG. 9. Since the number of such entries will be relatively small compared with the entire database, it may be sufficient to simply create a linear linked list of such entries, as depicted in FIG. 9. Of course, the size of the database is constantly increasing. As such, it may become necessary to have several levels of storage and caching. Given the envisaged application, most user queries will be for recent entries. Thus, the database may keep the last hours worth of entries in memory. If there is one entry per second for each of 100 channels in 100 geographic locations, this would correspond to 3600.times.100.times.100=36,000,000 entries which is easily accommodated in main memory. Entries that are older than one hour may be stored on disk and entries older than one week may be archived (e.g., backed up on tape) for example. The entries to this database can include time, location and channel information together with a unique identifier that is provided by the monitoring system. Of course, additional fields for each entry are also possible.

When a user query is received, the time, channel and geographic information are used to retrieve the corresponding unique identifier that is then used to access a second database that contains information associated with the identified work.

Figure 10:
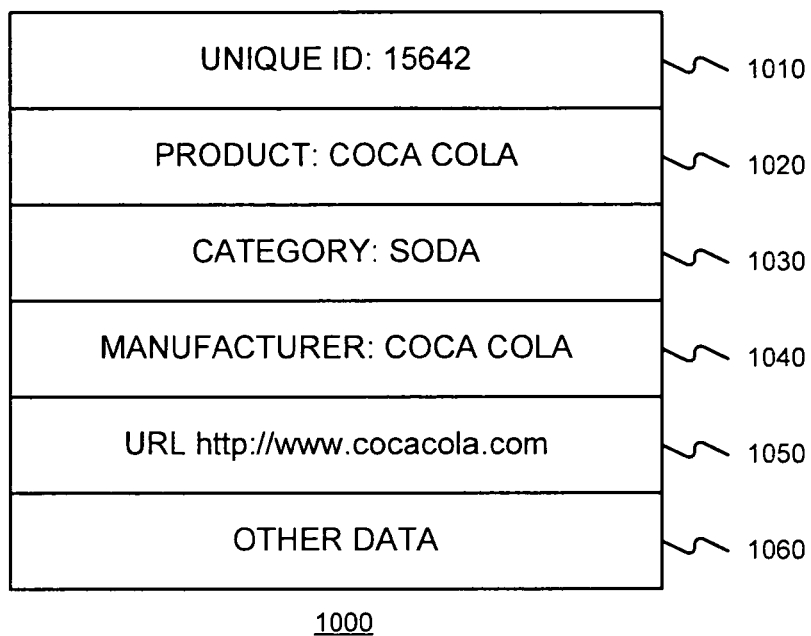
FIG. 10 is an exemplary data structure including work-related actions.

An entry 1000 in this second database is depicted in FIG. 10, which shows that associated with the unique identifier 1010, the name of a product 1020, a product category 1030, the manufacturer 1040 and the commercial's associated web site 1050. Many other data fields 1060 are also possible. Such additional fields may include fields that indicate what action should be taken on behalf of the requesting user. Example actions include simply redirecting a request to an associated Web site, or initiating an e-commerce transaction or providing an associated telephone number that may be automatically dialed if the querying device is a cell phone or displaying additional information to the user. This database is likely to be updated much less frequently, perhaps only as often as once or twice a day, as batches of new advertisements are added to the system. Alternatively, it might be updated as each new advertisement is added to the system.

An audience member (user) 810 watching a television commercial for example may react to the advertisement by initiating a query to the database center 840b. The device whereby the user initiates the query might be a television or set-top-box remote control, or a computer or a wireless PDA or a (WAP-enabled) cell phone or a specialized device. Typically, the query will occur during the airing of the commercial or a shortly thereafter. However, the time between the broadcasting of the advertisement and the time of the associated query is not critical and can, in some instances be much longer. For example, the audience member might bookmark the query information in a device such as a PDA or a specialized device similar to those developed by Xenote for their Itag radio linking. Later, the audience member may transmit the query to the database center 840b. This might happen hours or even days later.

The query contains information that the database center 840b uses to identify the work being viewed. This information might include the time and place where the audience member was, together with the channel being viewed. Other identifying information is also possible. The query may also contain additional information that may be used to facilitate the user's transaction and will include the return address of the user. For example, if the user is intending to order a pizza after seeing a Pizza Hut advertisement, the query may also contain personal information including his or her identity, street address and credit card information.

When the database center 840b receives a query, data in the query is used to identify the work and associated information. A number of possible actions are possible at this point. First, the database center 840b may simply function as a form of proxy server, mapping the audience member's initial query into a web address associated with the advertisement. In this case, the audience member will be sent to the corresponding Web site. The database center 840b may also send additional data included in the initial query to this Web site 850 in order to facilitate an e-commerce transaction between the audience member and the advertiser. In some cases, this transaction will not be direct, but may be indirect via a dealer or third party application service provider. Thus, for example, though an advertisement by Ford Motor Company may air nationally, viewers may be directed to different Web sites for Ford dealerships depending on both the audience member's and the dealerships' geographic locations. In other cases, advertisers may have contracted with the database center 840b to provide e-commerce capabilities. This latter arrangement has the potential to reduce the amount of traffic directed over the public Internet, restricting it, instead to a private network associated with the owner of the database center.

If the audience member (user) is not watching live television but is instead watching a taped and therefore time-shifted copy, then additional processes are needed. For the new generation of digital video recorders, irrespective of the recording media (tape or disk), it is likely to be very easy to include information identifying the location of the recorder, as well as the time and channel recorded. Location information can be provided to the recorder during the setup and installation process, for example. Digital video recorders, such as those currently manufactured by TIVO of Alviso, Calif. or Replay TV of Santa Clara, Calif. have a network connection via telephone, which can then send the query of an audience member to the database center 840b using the recorded rather than the current information.

In cases where query information has not been recorded, it is still possible to initiate a successful query. However, in this case, it may be necessary to extract the feature vector from the work of interest and send this information to the monitoring center 840a where the feature vector can be identified. This form of query is computationally more expensive but the relative number of such queries compared to those sent to the database centers 840*b* is expected to be small. It should also be noted that the physical separation of the monitoring and database centers, depicted in FIGS. 6 and 7, is not crucial to operation of the system and simply serves to more clearly separate the different functionality present in the overall system configuration.

Although the implementation architectures described above focus on the television media, it is apparent that the present invention is applicable to audio, print and other media.

§ 4.4 Conclusions

None of the embodiments of the invention require modification to the work or content, i.e., no active signal is embedded. Consequently, there is no change to the production processes. More importantly, from a user perspective, deployment of this system need not suffer from poor initial coverage. Provided the database is sufficiently comprehensive, early adopters will have comprehensive coverage immediately. Thus, there is less risk that the consumer will perceive that the initial performance of the deployed system is poor. Further, the present invention permits statistics to be gathered that measure users' responses to content. This information is expected to be very useful to advertisers and publishers and broadcasters.

What is claimed is:

1. A method comprising:

receiving, from a user electronic device at a computer system, one or more extracted feature vectors that are compact representations of one or more video frames of a video displayed at the user device;

identifying, at the computer system, one or more products related to the one or more video frames based at least in part on an approximate nearest neighbor search, which is a sub-linear search of an electronic database of reference feature vectors corresponding to one or more reference works that identifies any match within a threshold of at least one of the reference feature vectors to the one or more extracted feature vectors but does not guarantee to identify the closest match to the one or more extracted feature vectors;

providing, by the computer system to the user electronic device, the identified one or more products along with action information associated with the identified one or more products, wherein the action information is related to an action to be performed at the user electronic device;

receiving, at the computer system from the user electronic device, a selection of one of the identified one or more products; and providing, to the electronic device, machine readable instructions for performance of the action associated with the selected one of the identified one or more products.

2. The method of claim 1, wherein the extracted feature vectors are a pseudo-random sample of pixels from the at least the portion of the one or more video frames.

3. The method of claim 1, wherein the extracted feature vectors are a low-resolution copy of the at least the portion of the one or more video frames.

4. The method of claim 1, wherein the extracted feature vectors are average intensities of one or more blocks of pixels of the at least the portion of the one or more video frames.

5. The method of claim 1, wherein the action associated with the selected one of the identified one or more products is redirecting a request to an associate website by a network address translation.

6. The method of claim 1, wherein the action associated with the selected one of the identified one or more products is displaying additional information to the user.

7. The method of claim 1, wherein the action associated with the selected one of the identified one or more products is automatically dialing a telephone number.

8. The method of claim 1, wherein the user electronic device is a personal computer.

9. The method of claim 1, wherein the user electronic device is a cell phone.

10. The method of claim 1, wherein the user electronic device is a set top box.

* * * * *